May 26, 1936.  J. R. PEIRCE  2,042,324
TABULATOR
Filed April 7, 1930   18 Sheets-Sheet 5

May 26, 1936.    J. R. PEIRCE    2,042,324
TABULATOR
Filed April 7, 1930    18 Sheets-Sheet 6

Inventor
J. R. Peirce
By his Attorney
W. N. Wilson

May 26, 1936.  J. R. PEIRCE  2,042,324
TABULATOR
Filed April 7, 1930  18 Sheets-Sheet 7
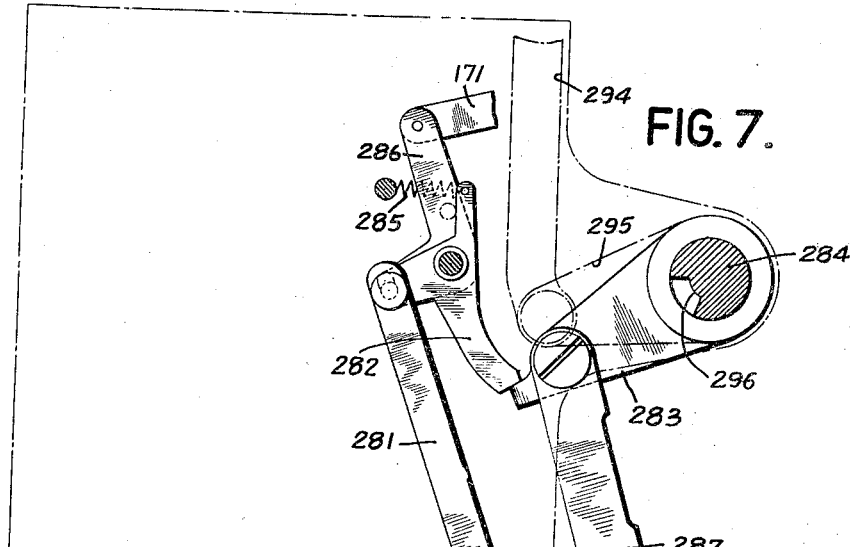
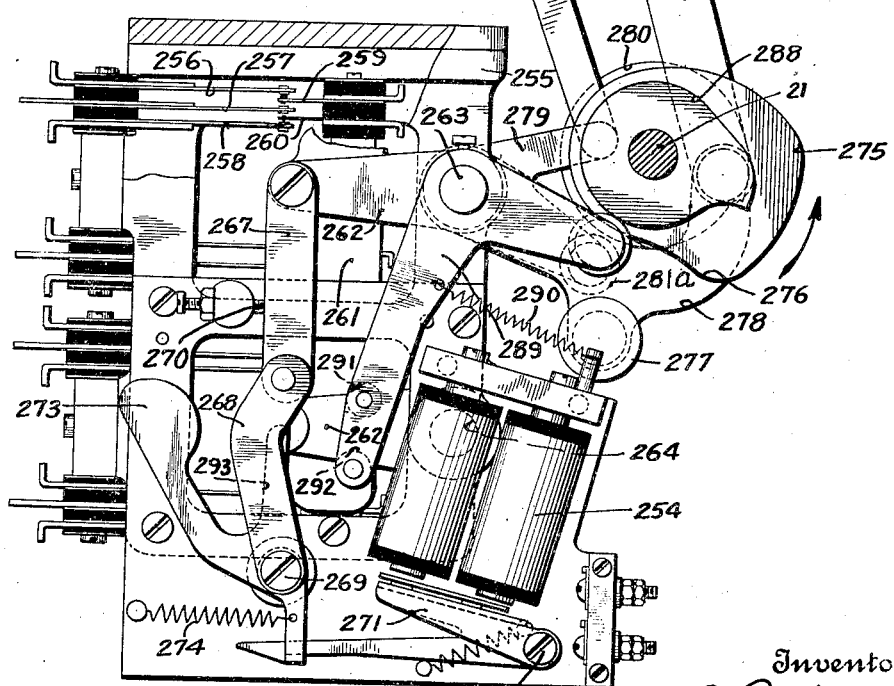
FIG. 7.
Inventor
J. R. Peirce
By his Attorney
W. M. Wilson May 26, 1936.　　　J. R. PEIRCE　　　2,042,324
TABULATOR
Filed April 7, 1930　　18 Sheets-Sheet 8

Inventor
J. R. Peirce
By his Attorney
W. M. Wilson

May 26, 1936.　　　　J. R. PEIRCE　　　　2,042,324
TABULATOR
Filed April 7, 1930　　　18 Sheets-Sheet 9
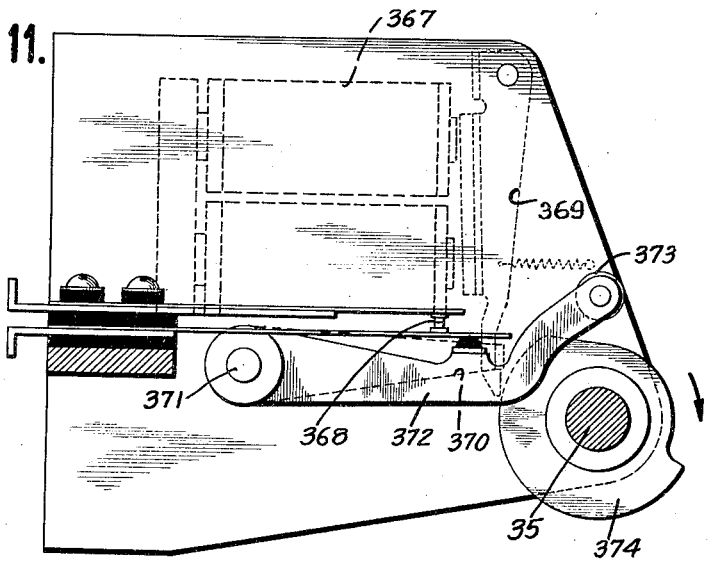
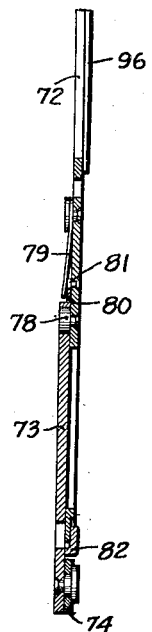
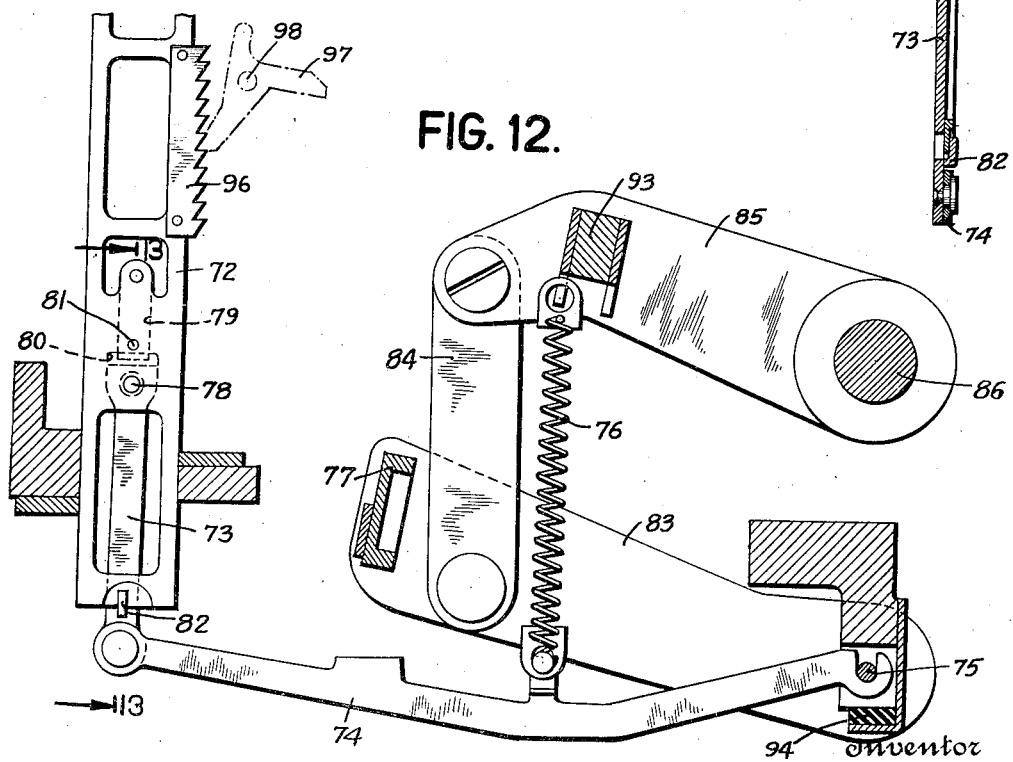

May 26, 1936.  J. R. PEIRCE  2,042,324
TABULATOR
Filed April 7, 1930    18 Sheets-Sheet 10

Inventor
J. R. Peirce
By his Attorney
Wm Wilson

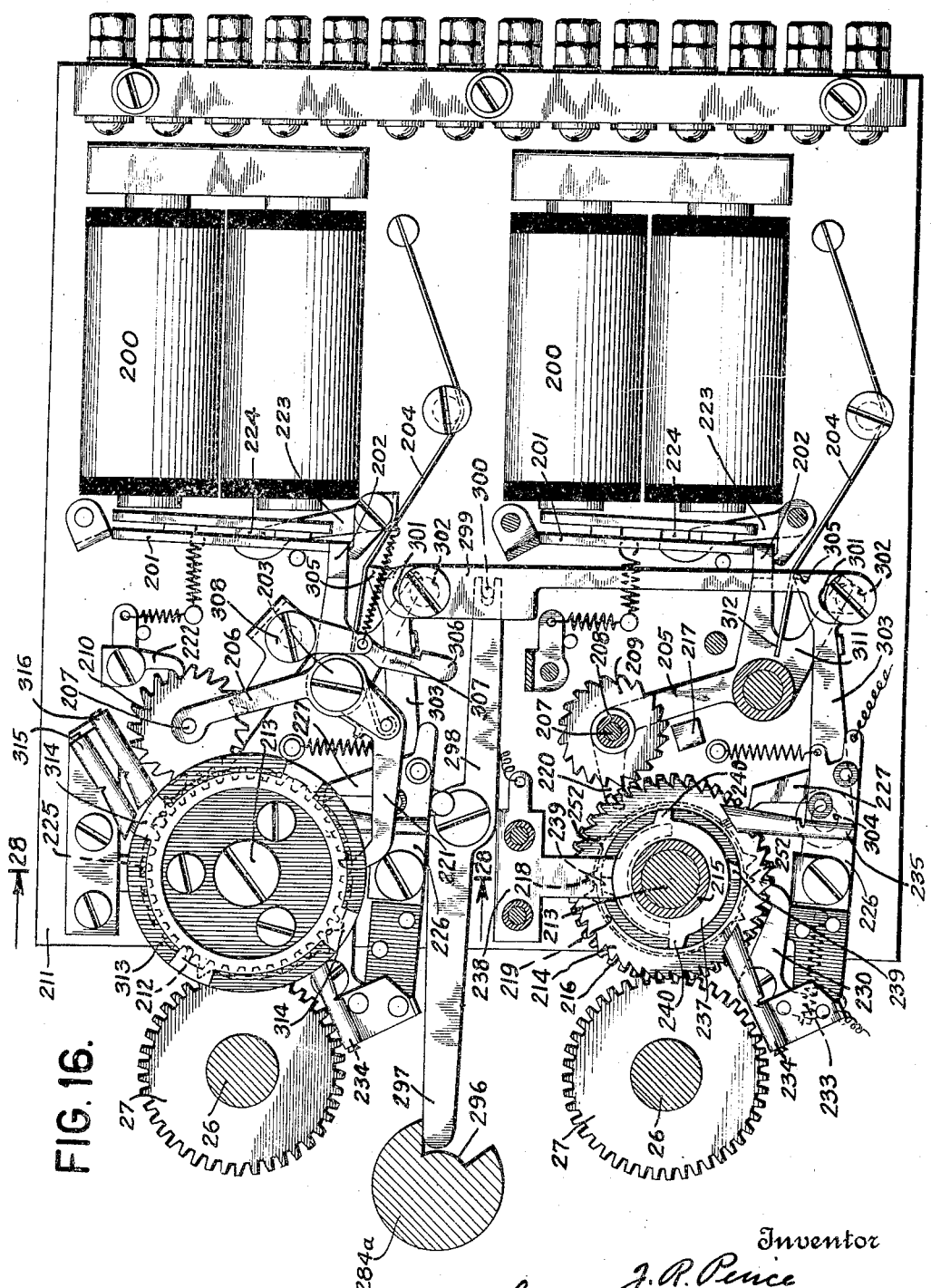

May 26, 1936.　　　　J. R. PEIRCE　　　　2,042,324
TABULATOR
Filed April 7, 1930　　　18 Sheets-Sheet 12
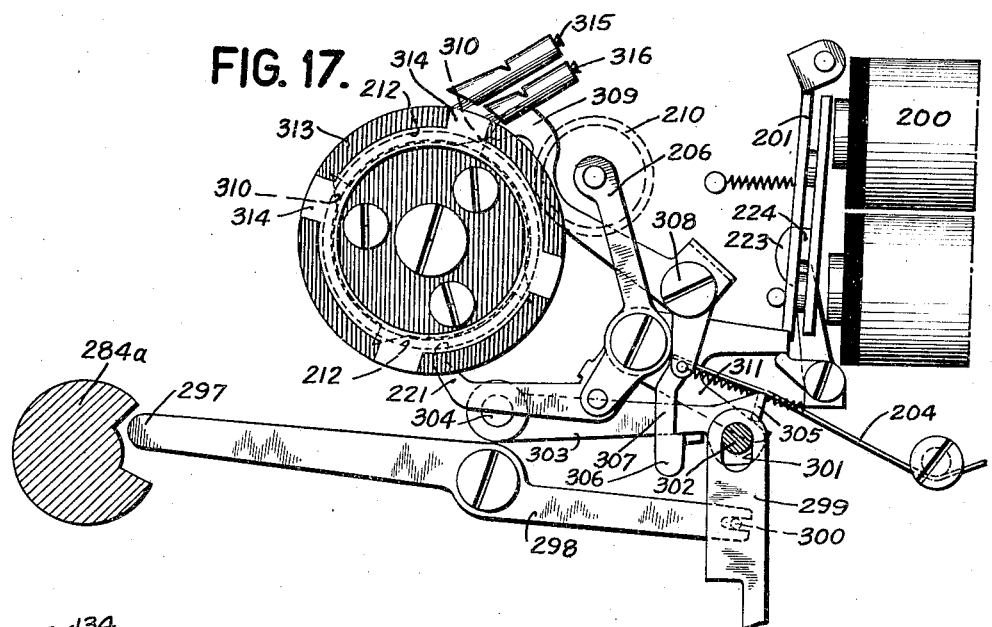
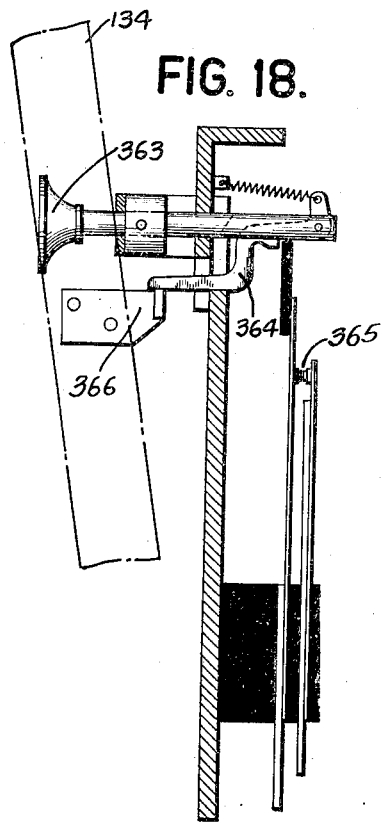
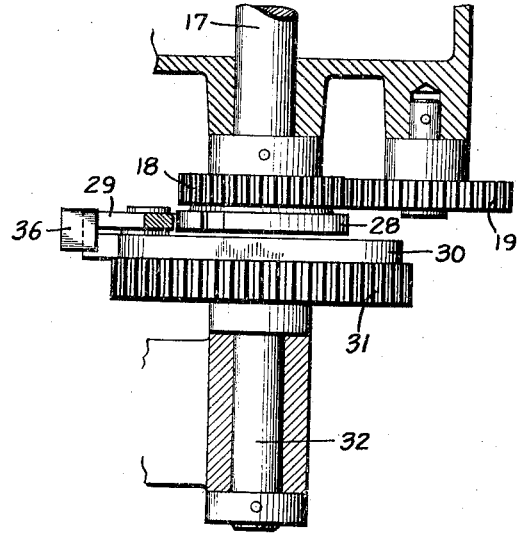

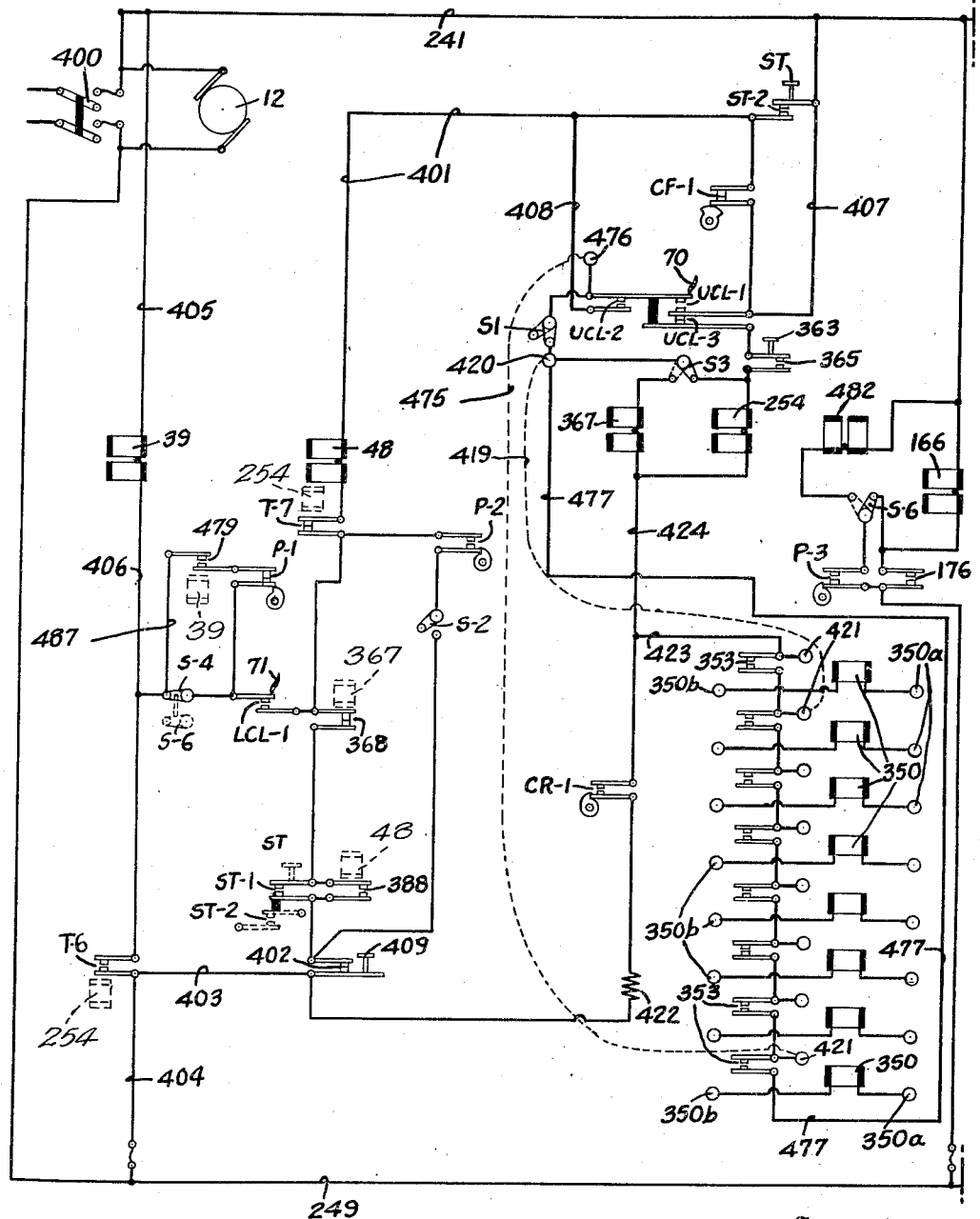

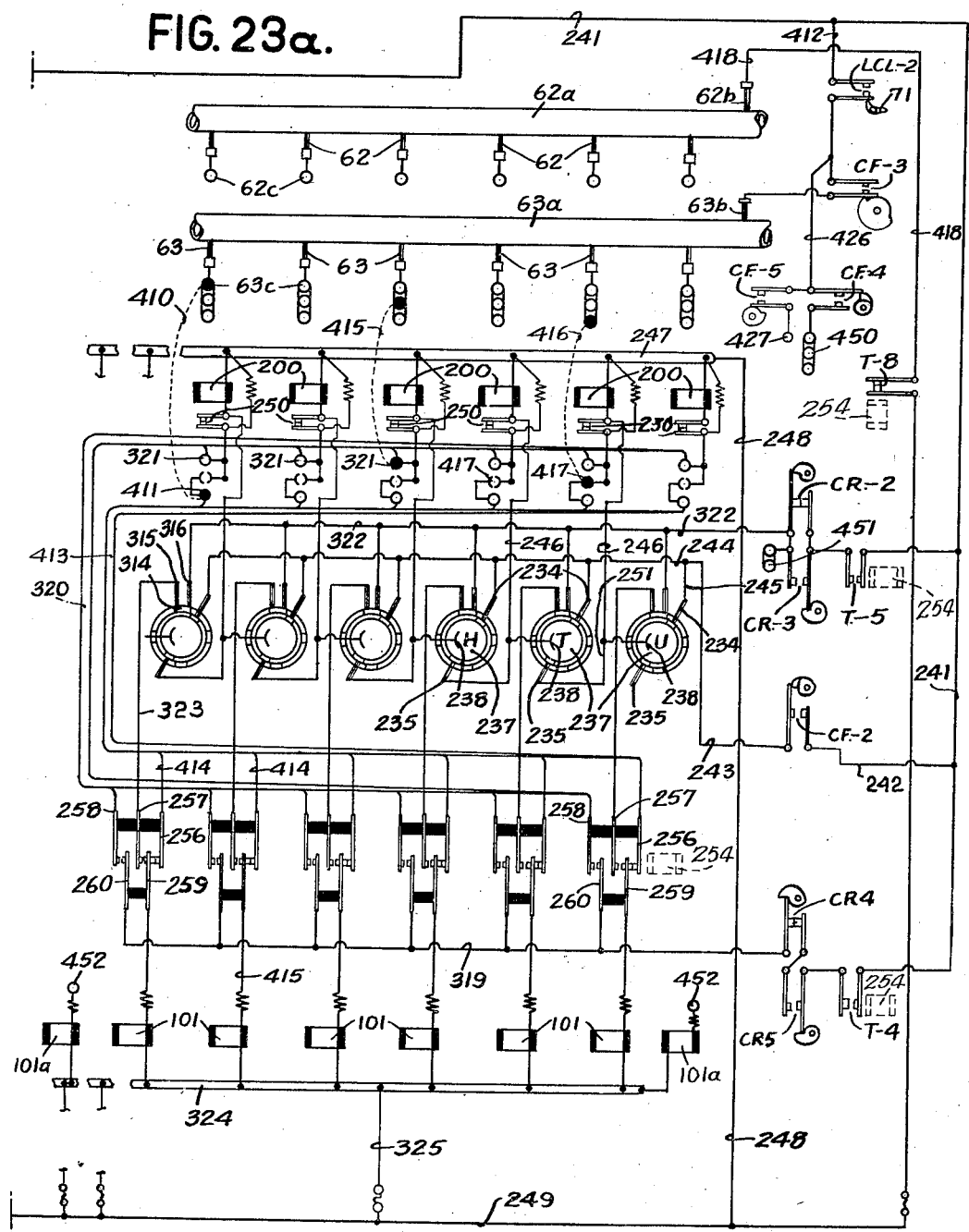

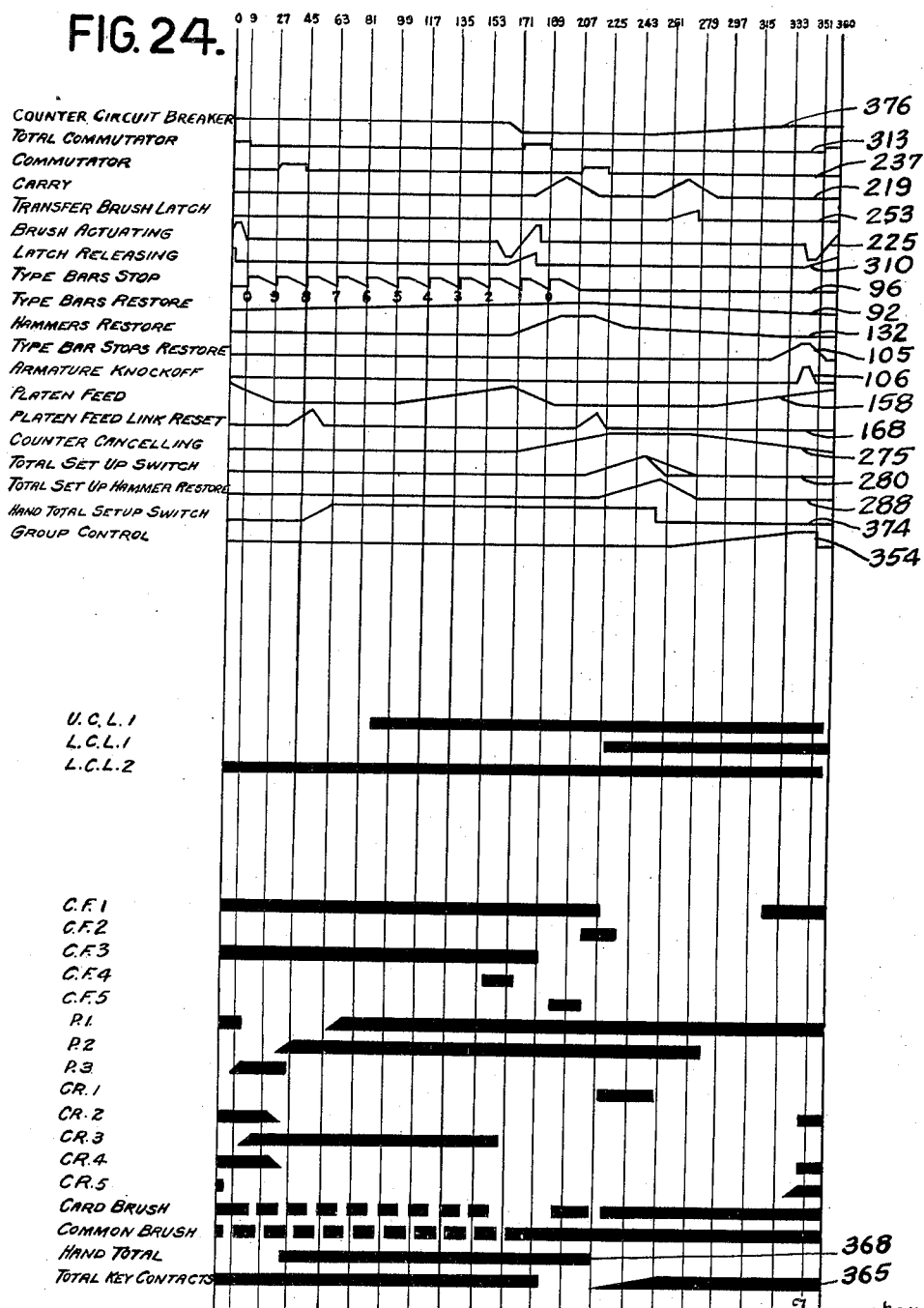

May 26, 1936.  J. R. PEIRCE  2,042,324
TABULATOR
Filed April 7, 1930  18 Sheets-Sheet 18
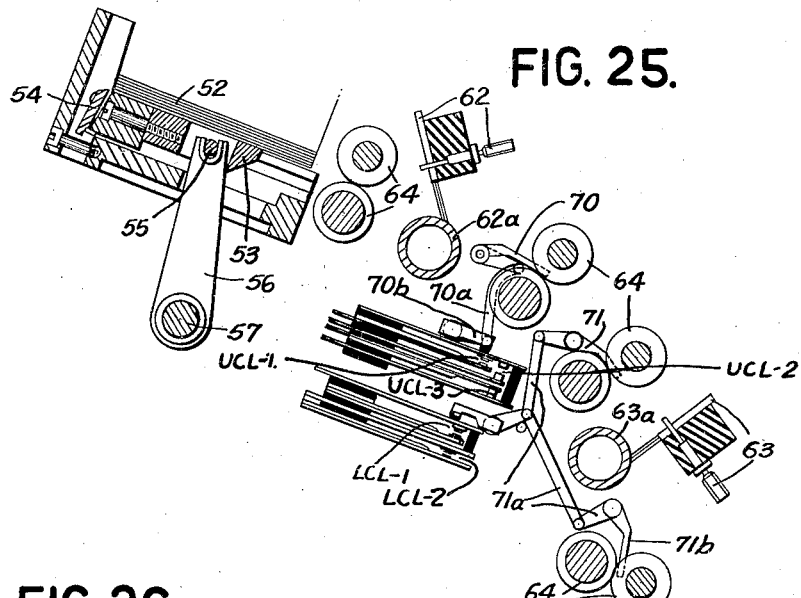
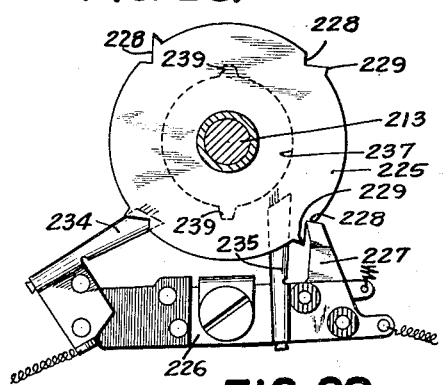
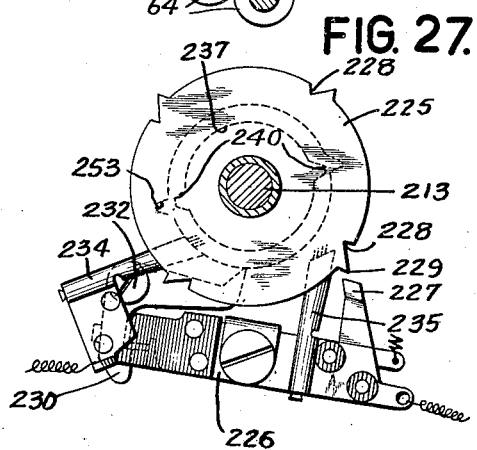
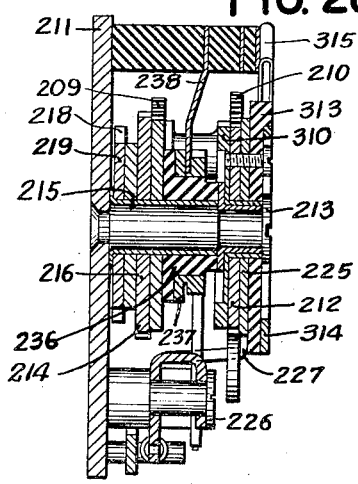
Inventor
J. R. Peirce
By his Attorney
W. M. Wilson Patented May 26, 1936

2,042,324

UNITED STATES PATENT OFFICE 2,042,324

TABULATOR

John Royden Peirce, New York, N. Y., assignor, by mesne assignments, to International Business Machines Corporation, New York, N. Y., a corporation of New York Application April 7, 1930, Serial No. 442,348

6 Claims. (Cl. 235—92)

This invention is directed to improvements in record controlled accounting machines. The record cards are perforated according to the well known Hollerith system and the machine is adapted to sense the cards electrically and print upon a record sheet the interpretation of those perforations.

One of the objects of the invention is to provide a novel accumulator in which radially shiftable gears are used for securing the necessary differential action and wherein such gears are ratchet shaped; formed with a minimum pressure angle to overcome the tendency to disengage which is common in the use of involute gear shapes.

Another object is to provide a novel positioning device for type bars, whereby the restoring shocks of the type bars may be lessened.

A further object is in the provision of a type bar having more than one character of a kind thereon, one such character being further than the other from the printing line.

Another object is to provide a type bar structure which permits the ready disconnection of the bar from its actuator for removal from the machine.

A still further object is to provide simplified means for deriving totals from the accumulator wherein a simple brush and commutator device is provided for taking a total; and the total is taken upon the arrival of the accumulator elements at zero position after being forwardly reset by the differential actuator.

Another object is to provide in an accumulator, means whereby, when taking a total, such accumulator elements as stand at zero will prevent their associated type bars rising through the range of significant figures.

A still further object resides in the provision of novel and compact circuit shifting devices whereby listing circuits may quickly be transferred into totaling circuits when occasion requires.

Another object is to provide a machine wherein the electric controlling devices are reduced to a minimum, consistent with successful operation by the use of low potential current which permits the elimination of, all arcing contacts necessary in high potential circuits.

Another object is to provide a type bar having a zero in advance of the significant figures and a second zero following the same, together with means whereby the printing hammers of such type bars will be constrained against tripping when either zero is raised to printing position.

A still further object resides in the employment of novel devices which permit the use of so-called total cards to control the operation of the machine.

Another object is the provision of a removable sectional structure of automatic control devices comprising control contacts and their operating magnets, wherein one or more contacts and magnets are mounted on a plate. The plates are slidably inserted for operation and as many plates may be used as will give the desired number of columns of control.

Further and other objects and advantages will be hereinafter set forth in the accompanying specification and claims, and shown in the drawings, which by way of illustration show what is now considered to be the preferred embodiment of the invention.

In the drawings:

Fig. 5a is a section taken on line 5a—5a of Fig. 5;

Fig. 7 is a detail view of mechanism for operating circuit switching contacts. This view is taken on line 7—7 of Fig. 4;

Fig. 11 is a detail of a timing device used in connection with hand totaling operation. The view is a section on line 11—11 of Fig. 5;

Fig. 12 is a detail view of the lower part of a type bar and its operating connections, the parts being shown in moved position;

Fig. 13 is a section taken on line 13—13 of Fig. 12 showing structural details;

Fig. 16 is a front view of a pair of accumulators;

Fig. 17 is a position detail of accumulator elements;

Fig. 18 is a detail of the "total" key;

Fig. 19 is a detail section taken on line 19—19 of Fig. 2;

Figs. 23 and 23a taken together form a wiring diagram of the electric circuit of the machine;

Fig. 24 is a timing chart of the various mechanical and electrical devices;

Fig. 25 is a detail view of card feeding devices, showing the arrangement of card lever contacts;

Fig. 26 is a detail position view of transfer mechanism in "9" position;

Fig. 27 is a detail position view of transfer mechanism in "0" position;

Fig. 28 is a sectional view taken on line 28—28 of Fig. 16.

Fig. 29 is a fragment of a "total-card".

Figure 1:
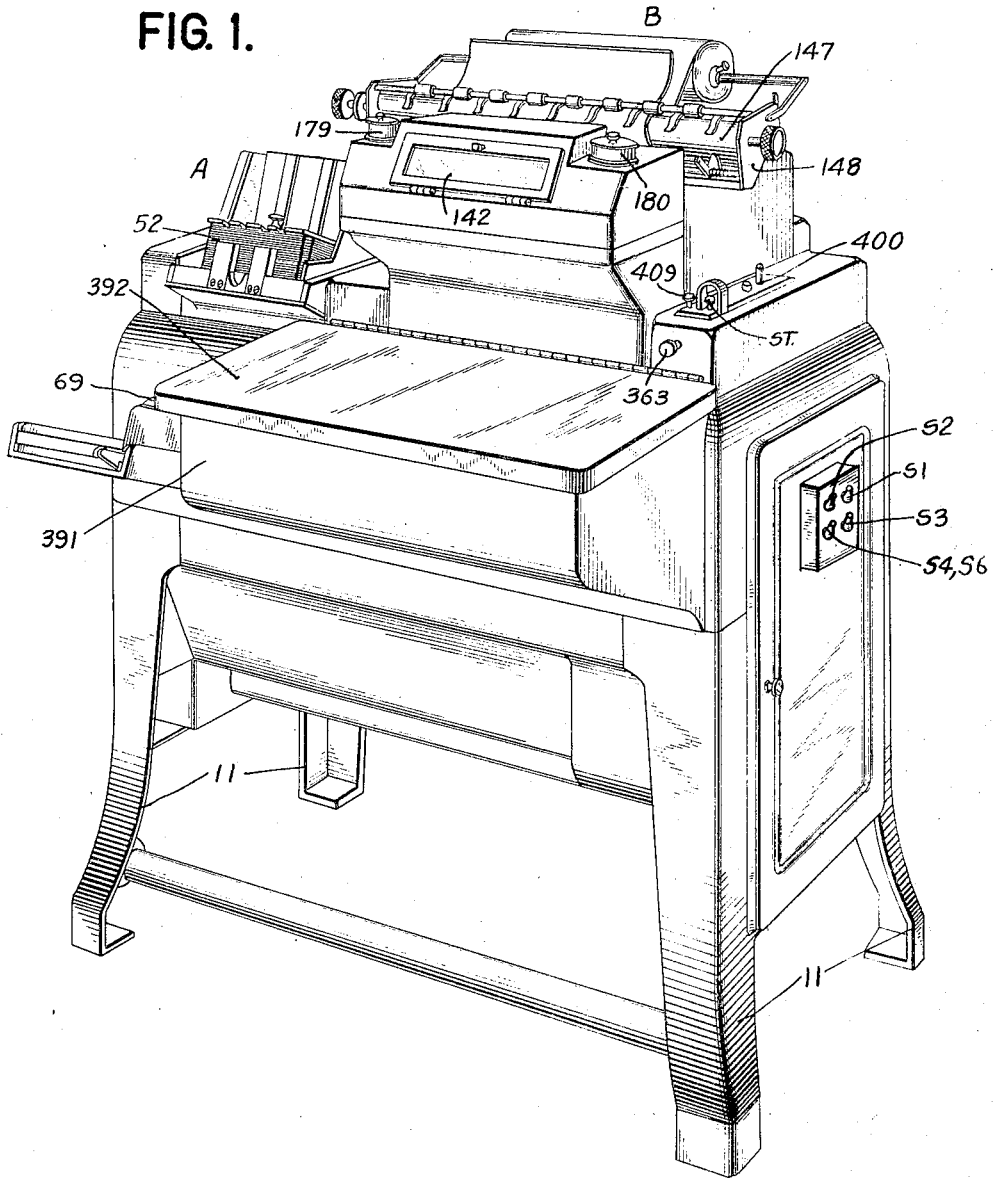
Fig. 1 is a perspective view of the complete machine.
Figure 3:
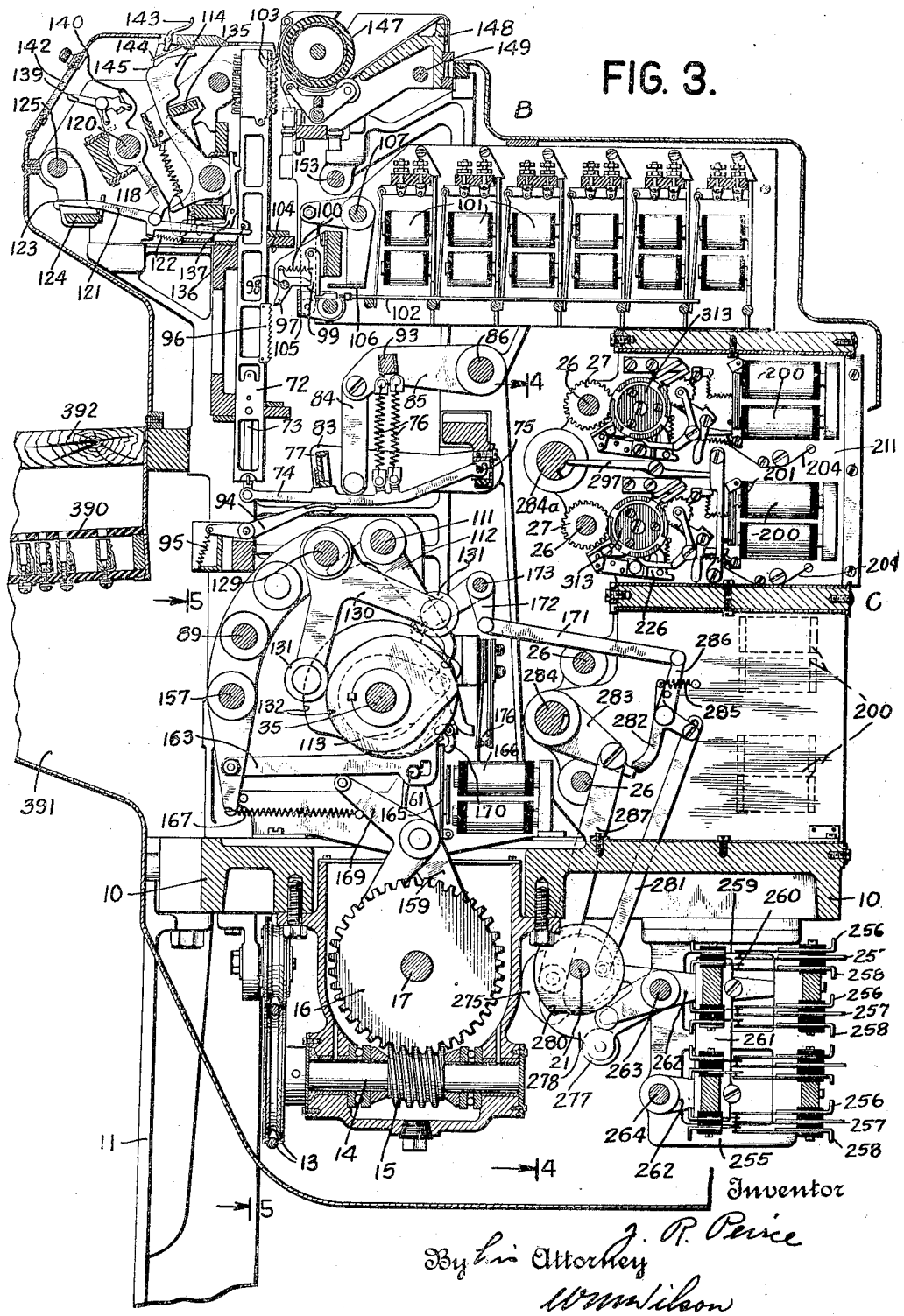
Fig. 3 is a central section taken on a plane parallel to Fig. 2 and looking in the same direction.
Figure 4:
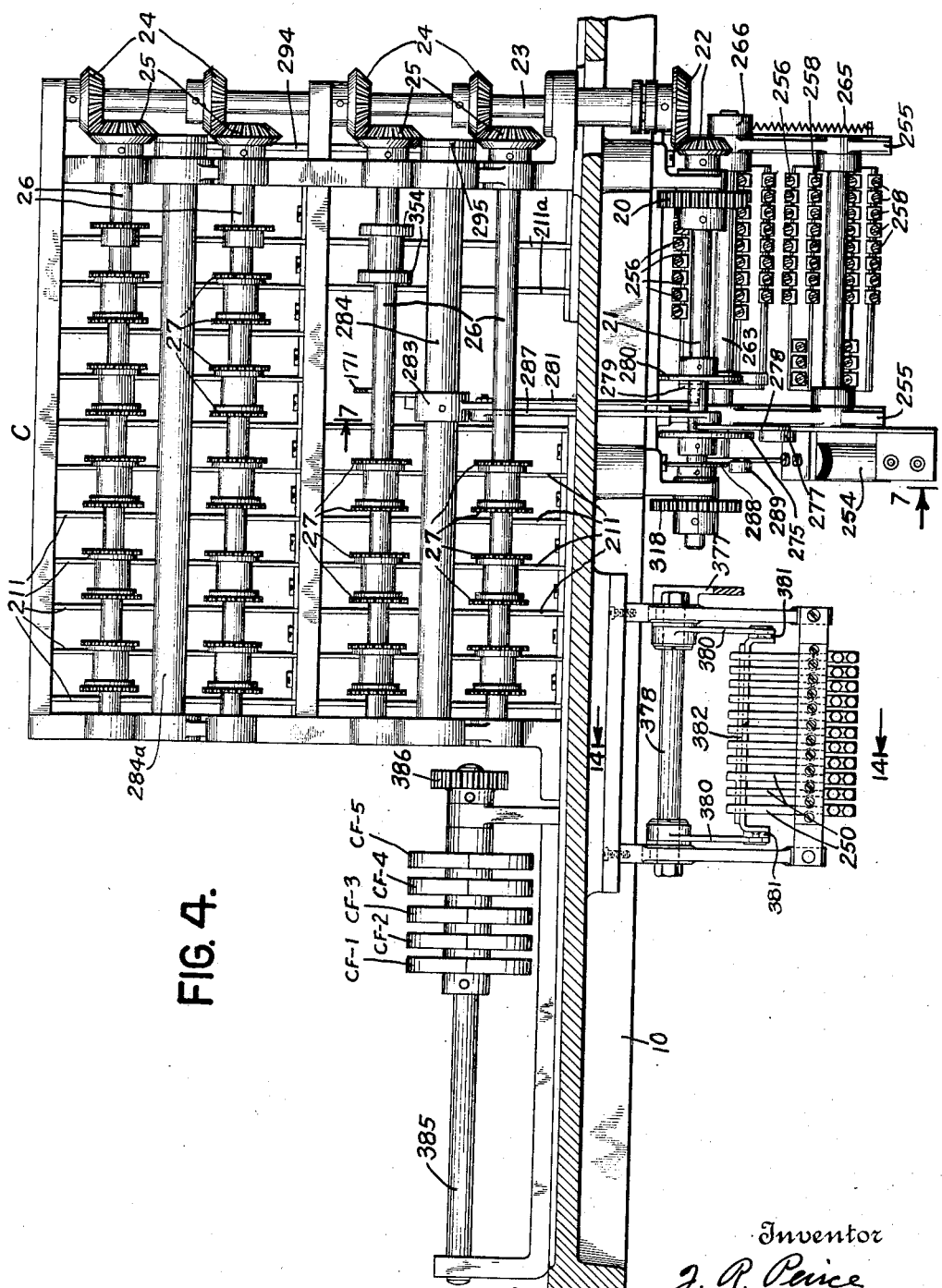
Fig. 4 is a section taken on line 4—4 of Fig. 3 showing the arrangement of the accumulating units and the driving means therefor.

The machine comprises principally a card reading device designated generally as A in Fig. 1, printing type mechanism and associated control devices B, and accumulators C (Figs. 3 and 4).

*Main drive*

These devices are mounted upon a base 10 supported by legs 11 (see Figs. 1, 2, 3, 4 and 5). A motor 12 attached to the underside of base 10 (see also Fig. 22) has belt and pulley connection 13 with a worm shaft 14. The worm 15 mounted thereon, drives worm wheel 16 fixed upon shaft 17 so that said shaft continues running as long as the motor receives current.

At either extremity of shaft 17 are clutch devices adapted upon actuation to form a driving connection at one end to the card reading device and at the other to the printing type mechanism.

A gear 18 mounted upon constantly running shaft 17 through gears 19 and 20 drives shaft 21 which in turn through bevel gears 22 cause vertical shaft 23 to rotate. Upon this upright shaft are fixed several bevel gears 24 meshing with bevel gears 25 upon parallel shafts 26.

Thus, through this train of gearing, shafts 26 are seen to be in constant rotation, so that gears 27 (see Fig. 4) mounted upon these shafts will in turn keep in constant rotation the actuating elements of the accumulating units with which they are related and which will be hereinafter more fully explained.

The shaft 17 (Figs. 2, 5, 19 and 22) carries, adjacent to gear 18, a notched disk 28 adapted to be engaged by a dog 29 pivotally mounted upon an arm 30 integral with a gear 31. Gear 31 is carried by a stub shaft 32 in axial alinement with shaft 17 and, through idler gear 33, drives gear 34 mounted on cam shaft 35. An armature latch 36 pivoted at 37 upon an arm 38, normally holds dog 29 out of engagement with the driving disk 28 in the position shown in Fig. 2. A magnet 39, upon energization, draws armature latch 36 to the left as viewed in this figure releasing dog 29 so that its spring 40 may bring it into engagement with driving disk 28.

Upon deenergization of magnet 39 armature 36 will be moved by its spring into the path of a projecting toe of dog 29 to throw the dog out of engagement with disk 28. Arm 30 will be similarly engaged by armature 36 (see Fig. 19) to prevent further movement of gear 31 in a clockwise direction. Arm 38 is pivoted near its midpoint and provided at one end with a stout spring 41 to absorb the shock of stopping gear 31. The usual rebound latch 42 is also provided.

Figure 5:
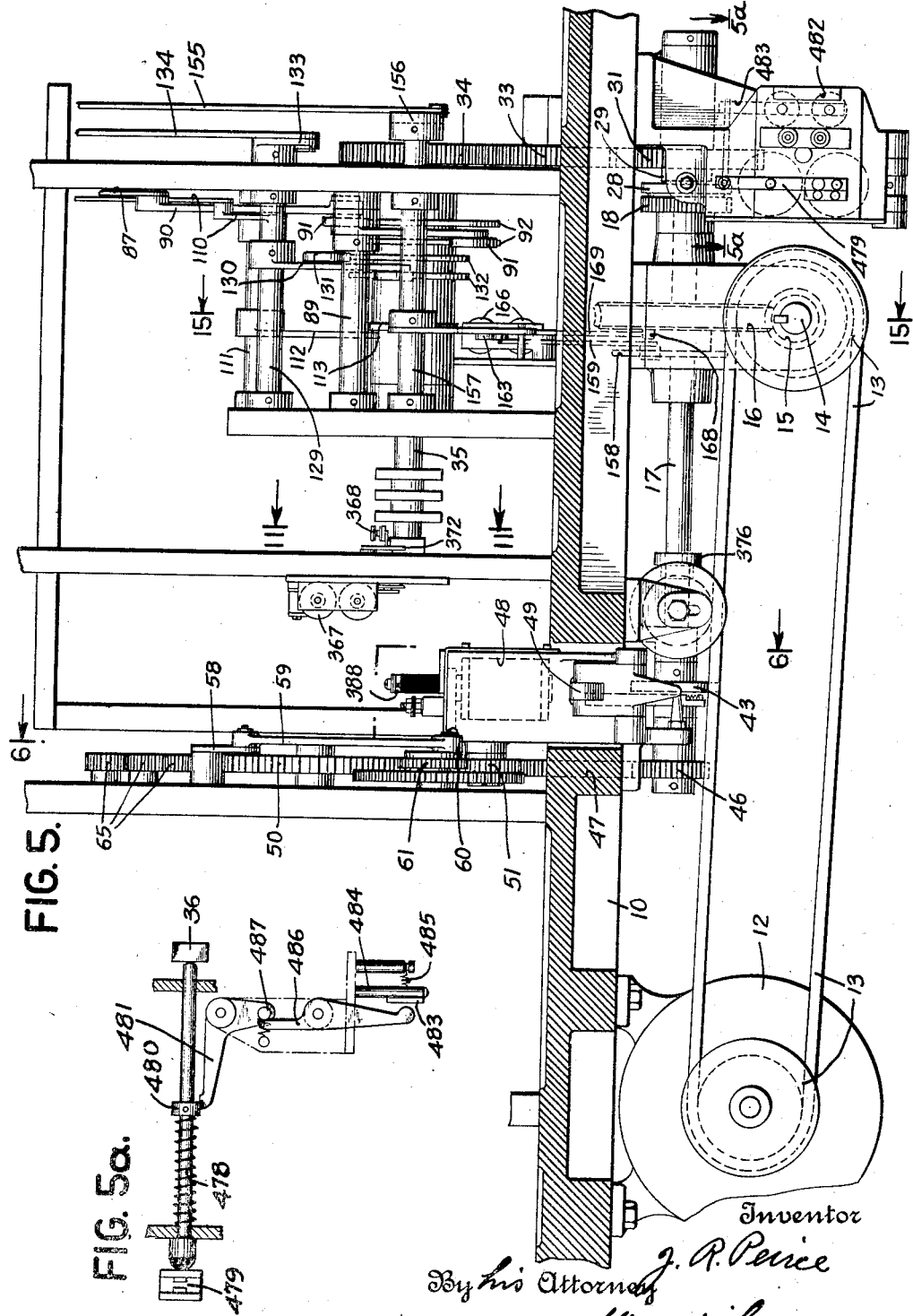
Fig. 5 is a section taken on line 5—5 of Fig. 3 showing the main drive and clutch devices.
Figure 6:
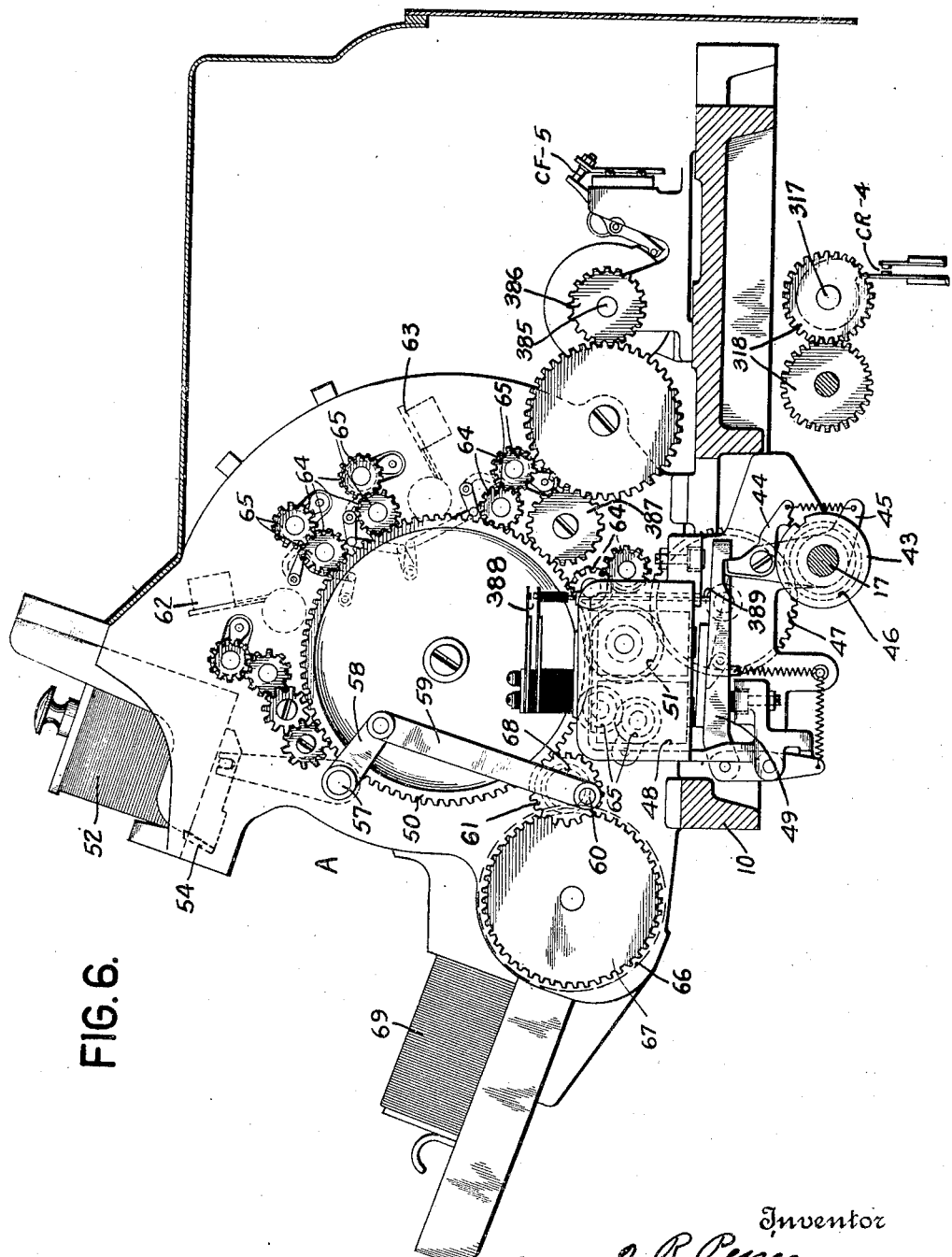
Fig. 6 is an outside view of the card analyzing section taken on line 6—6 of Fig. 5.
Figure 22:
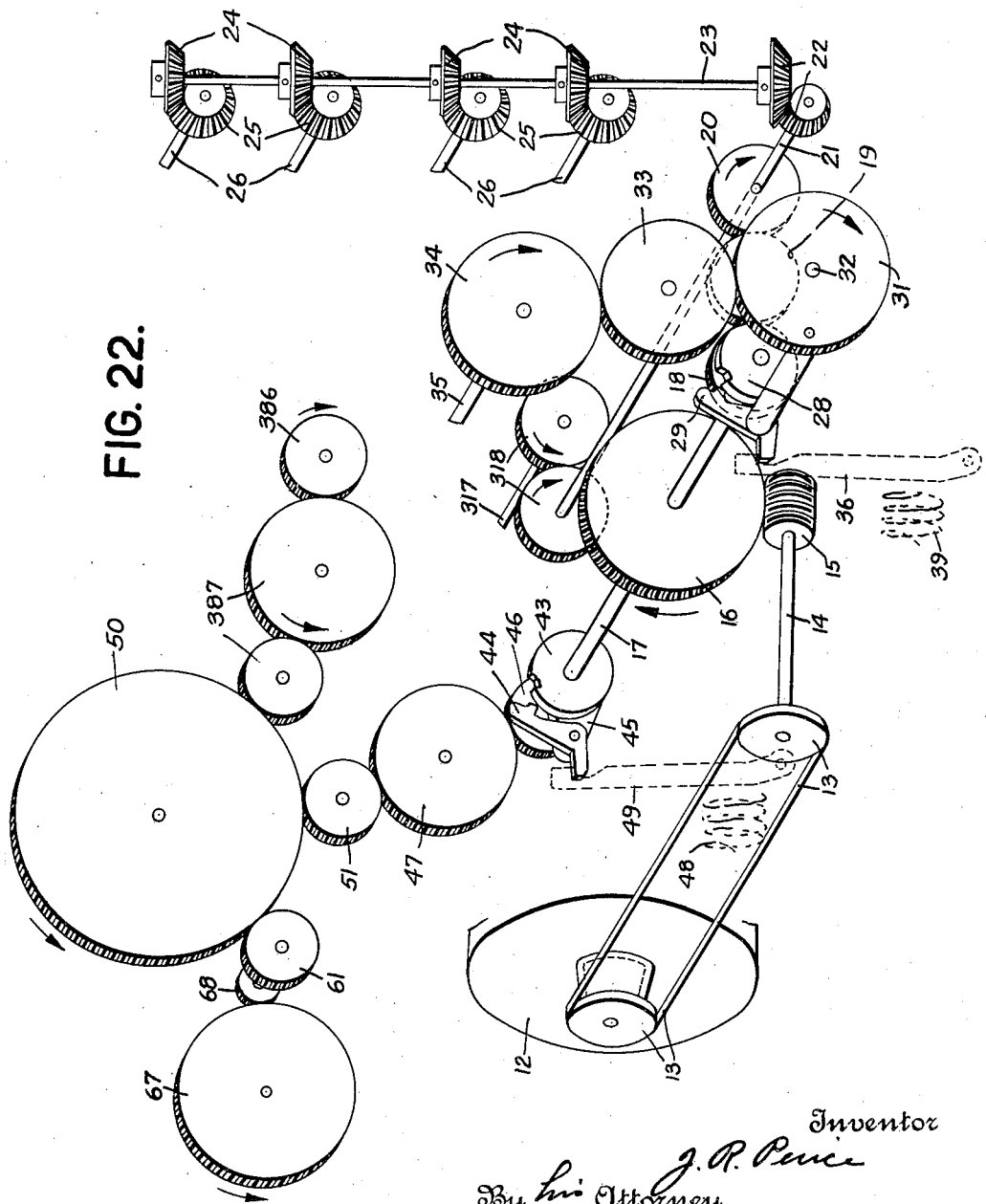
Fig. 22 is a diagrammatic view of the main driving elements of the machine.

In Figs. 5, 6 and 22 shaft 17 is shown as carrying a second clutch driving disk 43 cooperating with a dog 44 mounted upon an arm 45 to which is fixedly connected a gear 46 to drive the card reading device A, through an idler gear 47. The engagement of these clutch elements is controlled by magnet 48 and armature latch 49 in a manner described in connection with magnet 39 and its armature latch 37.

*Card reading device*

Energization of magnet 48 causes connection to be made between constantly running shaft 17 and a ring gear 50 through pinion 51 and idler gear 47. Referring now to Figs. 6 and 25 the record cards are fed singly from the supply magazine 52 by the usual card picker mechanism comprising in the present embodiment a slidably mounted reciprocal plate 53 carrying a picker knife 54 for cooperation with the record cards. The plate 53 has a pin and slot connection 55 with an arm 56 secured to a shaft 57 which carries at its end an arm 58 connected by a link 59 to a stud 60 mounted eccentrically on a pinion 61 meshing with ring gear 50. Each reciprocation of plate 53 and picker knife 54 causes a card to be fed from the magazine to the analyzing mechanism, wherein the card is presented to two sets of analyzing brushes 62 and 63 which sense the perforations thereon.

The feeding of the record cards is effected by concentrically arranged pairs of rollers 64 having driving connection to ring gear 50 through pinion gears 65. The cards pass from the last pair of rollers 64 to any suitable stacker mechanism 66, that shown being of the rotary type to the end of whose shaft is attached a gear 67 meshing with a pinion 68 secured to pinion 61. The cards are fed to a discharge stack 69 in the same order they were in originally.

The usual card levers may be positioned at the card stations to control various functions of the machine as will be described in connection with the electric circuit. After a record card passes the analyzing brushes 62 it contacts a lever 70 (Fig. 25) and through arm and links 70a rocks a contact operating lever 70b to close pairs of contacts UCL1 and UCL2 and to open contacts UCL3. Lever 70 is adapted to return to its normal position after a card has passed and before the succeeding card arrives at the lever. Before the record card reaches the lower brushes 63 it contacts a lever 71 having link connection 71a to a lever 71b, which is depressed by the card after it has passed the analyzing brushes 63. The positioning of levers 71 and 71b is such that while cards are feeding through the device the links 71a will remain in operative position to maintain contacts LCL1 and LCL2 in closed position. This is accomplished by spacing levers 71 and 71b at a greater interval than the distance between successive cards. Thus the leading edge of a card will depress lever 71 before the rear edge of the foregoing card has passed over lever 71b.

Operation of type bars

The type bars are raised by the action of the machine, their upward travel being arrested at various points as a result of an electric impulse actuating a latching device as will be described.

Referring now to Figs. 3 and 12 the type bars are shown at 72. Each bar is supported at its lower end, through a link 73, by an arm 74 slotted at its right end to engage a rod 75. A spring 76 attached near the mid-point of arm 74 urges said arm against rod 75 on one side of the spring connection and against a restoring member 77 on the other; which member normally holds the type bars in depressed position.

To the end that the type bars may be more readily disconnected from their actuating arms, the link 73 is detachably mounted on type bar 72 as shown in Fig. 13. Near its upper end link 73 is provided with an opening which engages a stud 78 riveted to bar 72. Link 73 is held in position by a leaf spring 79 pivotally attached to bar 72 and bearing against the extremity 80 of said link. To disconnect the parts, spring 79 is flexed to disengage a registering hole therein from stud 81 on the type bar and thereafter swung about its pivot and out of cooperation with extremity 80. Link 73 may now be lifted away from stud 78, the parts having sufficient resilience and clearance to permit so doing. An outwardly bent and upwardly extending prong 82 on link 73 engages the reduced lower end of type bar 72 to prevent lateral movement of the parts when in operation.

The restoring bar 77 is carried at each end by an arm 83 having an axis in line with the center of rod 75. Through links 84 these arms 83 are connected to arms 85 fixed to shaft 86 (see also Figs. 2 and 5) which has secured at one end an arm 87. A double-armed lever 88 pivoted at 89 is connected to arm 87 by a link 90 and has cam follower rollers 91 cooperating with complementary cams 92 mounted on shaft 35. For each revolution of shaft 35 restoring member 77 is oscillated once, causing the type bars to move upward in synchronism with the movement of the record cards past the sensing brushes. Springs 76 are connected between arms 74 and a bar 93 carried between arms 85, so that as this bar is rocked the type bars follow through the action of the springs. If the type bar 72 is stopped at an intermediate position while the restoring bar 77 continues to rise, the spring 76 will, of course, stretch. As seen in Fig. 12 the restoration of type bar 72 from some such position as shown is accomplished by engagement of arm 74 by bar 77, at which time the shock of impact is taken by spring 76, the slotted end of arm 74 moving away from rod 75 toward a resilient cushion 94. This type of structure renders the machine quieter in operation and greatly reduces vibration.

In Fig. 3 a lever 94 is shown contacting the under edge of arm 74 when the latter is in its depressed position thereby stretching spring 95 which thus helps to overcome the inertia of the descending type bar and assists in starting the bar on its upward stroke until arm 74 passes out of contact with lever 94.

Fixed to type bar 72 is a toothed member 96 adapted to cooperate with a bell crank stop 97 pivoted at 98 and held in normal position by a latch 99. A spring 100 holds the parts in restored relationship, (see Figs. 3 and 8). A magnet 101 is adapted, through its armature to actuate a call wire 102 to release stop 97 permitting it to engage member 96.

It may here be stated, that while a given index point position of the record card being analyzed is passing under the sensing brushes already described, the corresponding type element 103 will be approaching the printing line. The closure of an electric circuit (to be hereinafter traced) through a hole in the card at this point will cause energization of magnet 101 to stop the type bar in position to print the proper character. In the absence of any perforations in a card column the type bar associated therewith will rise until member 96 contacts with bar 104 in which position the lowermost type element 103 is presented to the printing line. This element is adapted when actuated to print the character "0".

Figure 2:
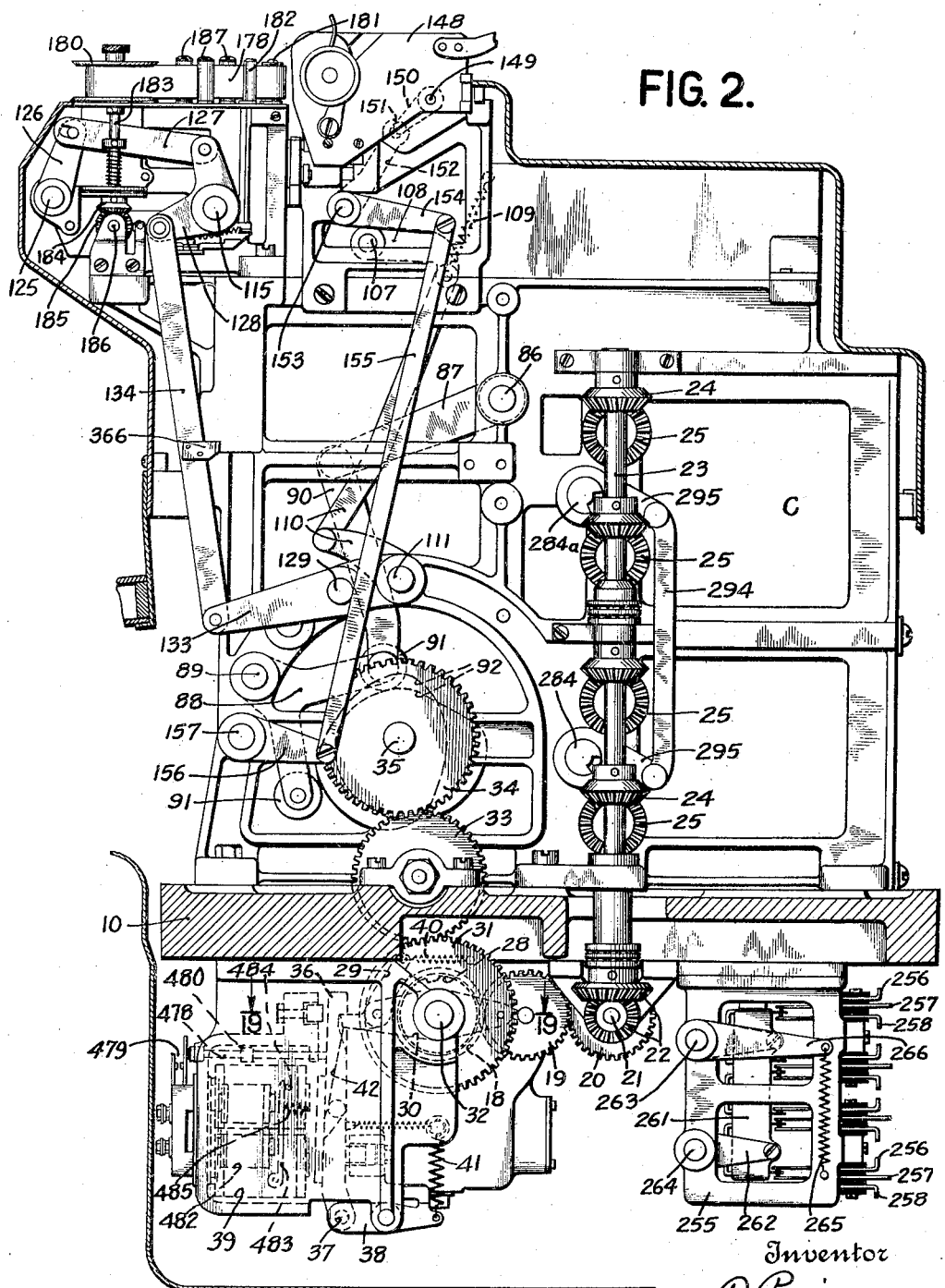
Fig. 2 is a side elevation looking at the right of the machine.

Positive restoration of stops 97 and latches 99 is obtained by bails 105 and 106. As shown in Fig. 3 bail 105 is link-connected to an arm secured to shaft 107 to which shaft bail 106 is also secured. In Fig. 2 shaft 107 carries an arm 108 urged in a counterclockwise direction by a spring 109. Link and arm 110 connect arm 108 through a short shaft 111 to a lever 112 (Fig. 3) which cooperates with a cam arm and roller 113 mounted on shaft 35 (see also Fig. 5). Reference may be made at this point to Fig. 24 wherein the timing relationship of the various mechanical devices in the machine are shown diagrammatically in the upper part and the electrical timing is shown in the lower part of the drawings. Inspection will show that bail 105 restores stops 97 before bail 106 restores latches 99 and through them the magnet armatures.

Hammer control

Figures 8, 9, 10:
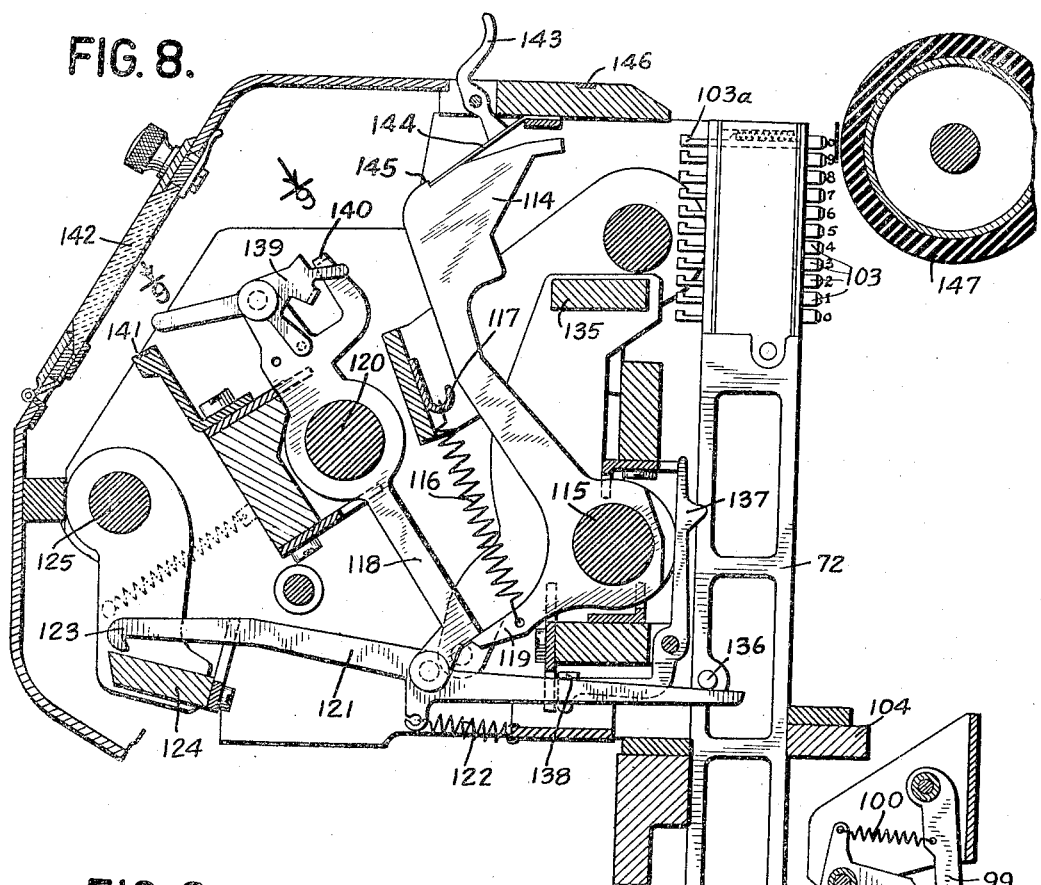
Fig. 8 is an enlarged detail of the type bar hammer controlling devices.
Fig. 9 is a view taken on line 9—9 of Fig. 8.
Fig. 10 is a detail of a record strip with certain entries thereon.

In Fig. 8, the hammers 114 for actuating the type members 103 are loosely mounted on a shaft 115 and pressed by springs 116, connected at one end to said hammers and at the other to a fixed plate 117, into printing action.

The hammers are normally locked against such action by latches 118 engaging the lower projection 119 of the hammers. The latches 118 are loosely mounted on a bar 120 and at their lower ends carry pivotally mounted levers 121. Springs 122 normally hold the latches in operative position. The hooked end 123 of lever 121 is adapted when depressed to engage the bevelled edge of a bail 124 fixed on a shaft 125. In Fig. 2, shaft 125 has affixed thereto an arm 126 with pin and slot connection to a link 127 attached to a bell crank 128 secured to shaft 115. Referring now to Fig. 3 a shaft 129 carries a double-armed lever 130 having cam follower rollers 131 cooperating with a pair of complementary cams 132 which through arm 133, attached to shaft 129, and link 134 actuate bell crank 128. See also Fig. 5. Shaft 115 carries a restoring bail 135 to restore the hammers to latched position after they have been tripped. As bail 135 approaches its right hand position of Fig. 8, link 127 causes clockwise rotation of shaft 125 to move bail 124 to the left so that if the hooked end 123 is in cooperation with such bail, the latch 118 will be moved to the left to unlatch the hammer whereupon the latter will be actuated by its spring to impel the type for printing.

A pin 136 carried by type bar 72 normally engages one end of lever 121 and holds the hooked end out of cooperation with bail 124. Should the type bar rise beyond the upper zero printing position of Fig. 8, the pin 136 releases lever 121 sufficiently to permit the same to cooperate with the bail 124. Rising of type bar to the upper zero position, as shown, permits no operation of the hammer tripping latch by bail 124. If type bar 72 rises to present the lower zero to the printing line, pin 136 will engage a pivoted bell crank 137 which through a lateral extension 138 will tilt lever 121 to inoperative position.

In order that all zeros to the right of a significant figure shall be printed, however, means are provided for tripping the hammers of such type. This means comprises a lever 139 which is pivotally mounted on each hammer latch 118 and is adapted to engage a projection 140 on the next latch to the right thereof (see also Fig. 9), so that any latch 118 which is actuated by bail 124 will in turn cause actuation of the latch to its right. In order to split the zero control, the lever 139 may be rocked clockwise out of engagement with projection 140 of the adjacent hammer latch. A numbered strip 141 may be provided to readily select the lever it is desired to position. A hinged, glass-panelled cover 142 gives ready access to the parts to be adjusted.

In order to lock any one or more of the printing hammers against operation, a series of levers 143 are provided which, when in the position of Fig. 8 bear down upon spring blades 144 so that the blades engage projections 145 on hammers 114 preventing any clockwise rotation of the same. The flattened end of lever 143 serves as a detent against accidental displacement. With lever 143 in the position shown in Fig. 3 spring blade 144 will swing out of engagement with hammer 114. A numbered strip 146 is provided to identify the type bar positions.

It is frequently desirable to print zeros to the left of the last significant character, as in the case of code numbers or decimals, an example of one instance being shown in Fig. 10 wherein to the right is a column of figures, several of which begin with a zero. To obtain this result, the levers 139 of the hammers associated with the columns of the left hand list of figures, are moved to their counterclockwise position. This then would cause zeros to be repeated across the sheet, but if in the columns associated with the space between the columns of items shown in Fig. 10 the levers 143 are moved to hammer locking position nothing will be printed and only such zeros will appear as are included in the four place code numbers shown.

*Paper line spacing*

Figure 15:
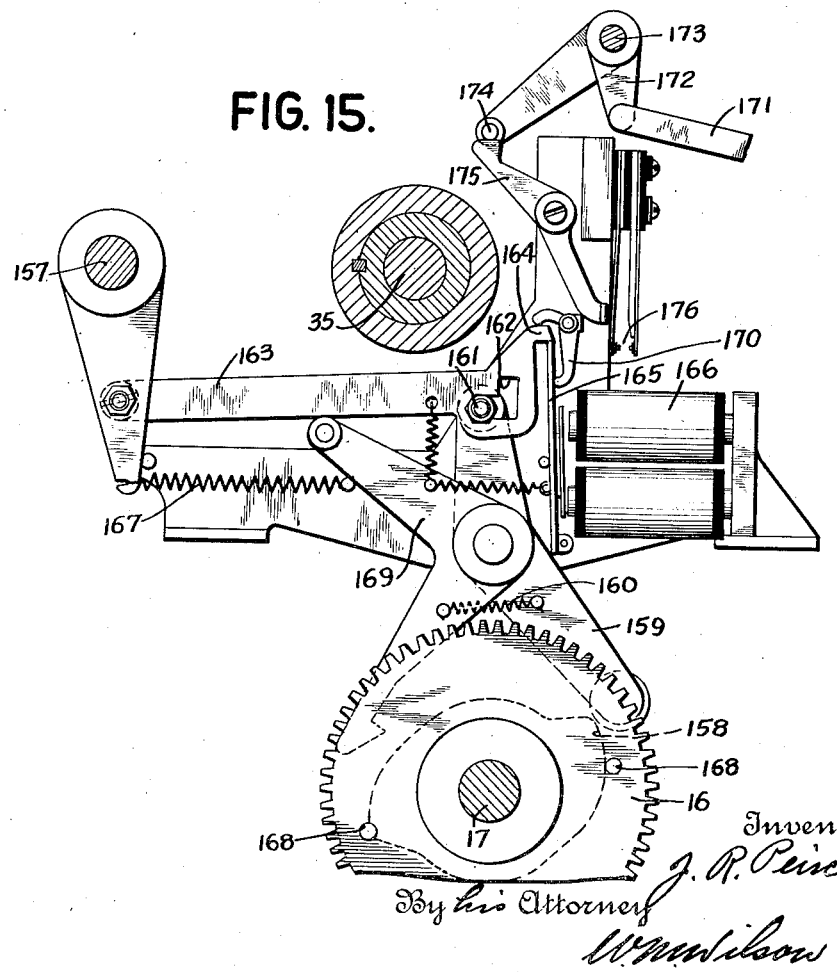
Fig. 15 is a detail section taken on line 15—15 of Fig. 5 showing the devices for controlling the spacing of the paper around the printing platen.

Referring to Figs. 1, 2 and 3, the report sheet is carried by the platen 147 supported by the paper carriage frame 148 in the usual manner. Spacing of the platen is effected by the usual pawl and ratchet (not shown) operated from shaft 149 journalled in frame 148. Fixed to shaft 149 is an arm 150 carrying a rod 151 cooperating with a bifurcated lever 152 mounted on stud 153. To this stud is secured an arm 154 connecting through link 155 with an arm 156 on shaft 157. In Figs. 5 and 15 the constantly running worm wheel 16 has affixed thereto a double cam 158 engaging a lever 159 urged by a spring 160 into contact with said cam. An upward extending arm of lever 159 carries a stud 161 which moves in an L-slot 162 of link 163. A nose 164 of link 163 rests upon armature 165. Magnet 166, energized at a time when the follower roller of lever 159 is on the low portion of cam 158 and stud 161 is to the right in slot 162, will permit link 163 to be drawn down into operating relationship with stud 161 so that as lever 159 is rocked counterclockwise shaft 157 will be actuated to cause spacing of platen 147.

A spring 167 restores shaft 157 and connected links. Following such paper spacing, a pin 168 in worm wheel 16 coacts with bell crank 169 to positively raise link 163 out of active engagement with stud 161 and latch it on armature 165. A double armed lever 170 is provided which acts to positively force link 163 down when armature 165 is actuated and in reverse order when link 163 is restored, to positively restore armature 165.

The double rise on cam 158 permits a second paper spacing actuation of the aforedescribed instrumentalities. Thus when totaling; after the sum has been printed, magnet 166 is energized to obtain a second spacing. Reference to Fig. 24 shows that cam 158 is timed to effect paper spacing before an item is printed and in the case of total printing also after the item is printed. During a total cycle the link 171 in Fig. 15 is drawn to the right; rocking an arm 172 on rod 173. Secured to this rod is an arm carrying a pin 174 which engages a lever 175 to close contacts 176. It is the closure of this contact which effects the already mentioned total spacing by sending a second impulse through magnet 166.

*Ribbon feed*

Referring to Figs. 1 and 2, the printing ribbon 178 is carried by the spools 179 and 180 and passes around guide spindles 181 and through guide members 182. The ribbon spools are detachably mounted on rods 183. These shafts carry bevel gears 184 adapted to be engaged by similar gears 185 on a shaft 186. This shaft is actuated by pawl and ratchet (not shown) in the usual manner when the hammer restoring member 135 operates.

The guide members 182 are adapted to be engaged by a clip or the like near the end of the ribbon so that feeding of the ribbon will move members 182 to cause lateral shifting of shaft 186 to reverse the feeding of the ribbon in a manner well known in the art. Interposed between the ribbon spools and guide members 182 are several pins 187 around which the ribbon 178 is guided. The additional frictional resistance caused by these pins aids in keeping the ribbon taut and lessens any tendency to sag.

*Accumulator*

In the present Hollerith system the passage of the card under the sensing brushes is synchronized with the balance of the mechanism to produce the proper differential action in accumulating and printing devices. Whenever an electrical impulse is sent to any printer magnet 101, an impulse may also be sent to a corresponding counter magnet 200 (Figs. 3, 16 and 17) in order that the accumulator may be actuated to properly enter the amount therein.

Energization of magnet 200 attracts armature 201, moving it to the right (Fig. 16) thereby unlatching arm 202 of an assembly, mounted for oscillation on stud 203, which is normally urged counterclockwise by spring 204. Therefore, when armature 201 releases arm 202 the assembly is rotated slightly counterclockwise. This assembly includes a pair of upwardly extending parallel arms 205 and 206 in the upper ends of which is fixed a horizontal rod 207. On rod 207 is mounted for rotation a sleeve 208 on which are fast the pinions 209 and 210.

In Fig. 16 two complete adding units are shown mounted on a common plate 211. The lower unit is similar in structure to the upper unit and has been illustrated with several parts removed to more readily explain the operation of the device.

Pinion 210 is constantly in mesh with gear 212 loose on stud 213. Pinion 210 and gear 212 are provided with long teeth to permit movement of pinion 210 away from the gear without disengagement therefrom. Pinion 209 is aligned to mesh with gear 214 whenever the assembly on which the pinion is carried is oscillated to the left. Gear 214 is fast on sleeve 215 on stud 213 (see also Fig. 28). Alongside of gear 214 and rotating with it is gear 216 in mesh with gear 27 which is in constant rotation being mounted as we have seen on constantly running shaft 26.

With the above construction in mind the differential action of the accumulator may be understood. When magnet 200 is energized, armature 201 releases arm 202 permitting it to rock until arm 205 rests against stop 217. This movement engages pinion 209 with gear 214 and causes the pinion to rotate in synchronism with gear 214 thereby causing pinion 210 and gear 212 to also rotate in synchronism therewith. This rotation continues until a hump 218 on cam 219 passes under finger 220 projecting from the upper end of arm 205 thereby, by rocking the pinion assembly clockwise, disengaging pinion 209 from gear 214 and permitting armature 201 to latch against arm 202. At the same time a detent 221 enters between teeth of gear 212 to retain it against inadvertent movement from the position to which it has been moved. Pinion 210 is also provided with a detent 222 to engage the same when its companion pinion 209 is out of engagement with gear 214. To positively restore armature 201 a member 223 is provided having a lateral projection 224 abutting the right side of armature 201, so that when arm 202 is restored the member 223 will be rocked counterclockwise to draw the armature away from magnet 200 if its spring has not already done so.

Both pinion 209 and gear 214 are formed with teeth resembling ratchets. The sides of the teeth which enter into driving engagement with each other are cut with a minimum pressure angle so that as the pinion 209 is rocked into engagement with gear 214 the tendency to throw the pinion out of engagement again is not present, as would be the case if gears having involute teeth were employed.

The teeth of pinion 210 and gear 212 are similarly undercut for the same reason to obtain the same certainty of continued engagement.

The accumulator begins to rotate at different times in the cycle depending upon when the impulse is received from the card sensing brush and the rotation of the accumulator is interrupted at a fixed point in the cycle by cam 219, thereby rotating the accumulator an amount proportional to the value of the digit represented by the card perforation.

*Electric transfer*

In the operating cycle of the machine, after rotation of the accumulator has been stopped by cam 219, an opportunity is provided for transfer operations to take place if any are required. The transfer operations are effected electrically in much the same manner as in Patent No. 1,372,965, issued March 29, 1921 to C. D. Lake for Electric transfer device.

After the adding portion of the machine cycle has been completed there may still remain a transfer or carry operation to be performed. That is to say, if any accumulator wheel has been turned to (or through) zero during the adding portion of the cycle, it is necessary to advance one or more adjoining wheels at the left one step in order to show a correct result. If the next adjoining wheel or wheels shows a digit "9" it is necessary to advance all the "9" wheels one step as well as advancing the first wheel to the left of the "9" wheels.

Fast to each gear 212 is a disk 225 (see also Figs. 26 and 27). The gear and disk are so driven as to make only one quarter revolution for each ten digits. Associated with each disk 225 is a spring pressed pivoted lever 226 having a finger 227 biased to bear constantly on the rim of disk 225. While disk 225 is indicating the digits 1 to 8 inclusive, finger 227 rests on a concentric portion of the rim, and when the disk indicates "9" the finger drops into a notch 228, as shown in Fig. 26. When disk 225 turns still further to indicate "10" or "0" a point 229 forces lever 226 to the position of Fig. 27 in which position it is held by latch 230 engaging catch plate 231 on lever 226. Latch 230 is pivoted at 232 and drawn towards latching position by spring 233 (Fig. 16).

Mounted on an insulating block at the left end of lever 226 is a brush 234, carrying a wire which serves to connect it to the electric circuit of the machine. Fast to the other end of lever 226 is a brush 235 insulated and also having a circuit-connecting wire.

Mounted on sleeve 215 (Fig. 28) for rotation on stud 213 is an insulating bushing 236 carrying a metallic ring 237. This ring is grooved to receive a plate brush 238 the lower end of which is arm shaped as shown in Fig. 16, to insure good electric contact with ring 237. Brush 238 is insulated from the machine and provided with a wire to connect it to the machine circuit.

Projecting from the rim of ring 237 are four equally spaced contact humps. The two diametrically opposed humps 239 at one side of brush 238 are arranged to contact with brush 235 while the two humps 240 on the other side of plate brush 238 are located to contact with brush 234.

The operation of these devices may best be understood by tracing the electric circuits involved. Referring to Fig. 23a, it will be assumed for convenience of explanation that the three accumulator units designated "U", "T" and "H" represent the "units", "tens", and "hundreds" positions of a continuous counter.

Let us assume that during the adding portion of the cycle, counter U has reached or passed "0" and the transfer devices of that accumulator element are in the position shown in Fig. 27. Counter T is assumed to be standing at "9" and the counter H reads less than "9". It is therefore necessary to advance both the H and T elements one step in order to show the proper result. This is done as follows: After cam 219 has restored the counter actuating devices as above described, the continued operation of the machine causes closure of cam contact CF2 to transmit an impulse from the right side of line 241 through wire 242, contact CF2, wire 243, to common bus wire 244, wire 245, brush 234 of unit "U", ring 237, plate brush 238, wire 246 to the counter magnet 200 of the "tens" counter T. Thence through bus bar 247 and wire 248, to left side of line 249. Contacts 250 open at this time of the machine cycle preventing any back circuits to other counter elements. This energization of magnet 200 of counter T advances the same as is necessary. But it is also necessary to advance element H. Therefore current is sent to its counter through wire 251, "9" brush 235, ring 237, plate brush 238, wire 246, and through "H" counter magnet to left side of line 249, thus advancing element "H". The impulse through the transfer circuit is timed to occur when brushes 234 and 235 are in contact with their respective humps on ring 237.

Transfer restoring cam 252 (Fig. 16) on cam 219 is so located as to act on finger 220 to permit the counter elements T and H to advance only one step, as is required to show the proper result. At the same time, cam 253 contacts latch 230 (Fig. 27) to release the latch from plate 231, thereby permitting lever 226 to return to normal position. The transfer operation is then complete and the accumulator is ready to begin another cycle. Inasmuch as element H indicates a digit between 1 to 8, inclusive, its finger 227 is on the concentric portion of disk 225 and neither of its brushes 234 or 235 will make contact during the transfer portion of the cycle and no impulse will be transmitted through that element to elements of higher order.

Total taking

When a total is to be taken of a group of items which have been accumulated, it is necessary to open certain listing circuits and close certain total printing circuits. The mechanism for effecting these circuit changes is shown in Figs. 2, 3, 4 and 7 in which a magnet 254 is adapted to be energized whenever a total is to be taken. Suspended from base 10 is a pair of brackets 255 supporting a series of contacts arranged in tiers for compactness, each of which comprises an upper blade 256, a center blade 257 and a lower blade 258. Cooperating with these fixed blades are blades 259, 260 mounted for vertical movement on end bars 261 supported by arms 262 secured to shafts 263 and 264 journalled in brackets 255. A spring 265 attached to an arm 266 on one end of shaft 263 tends to urge bars 261 downwardly from their normal, or listing position, wherein the blades 256 and 259 are in contact with each other.

At the other end of shaft 263, arm 262 carries a link 267 which forms a toggle connection with a link 268 pivoted at 269. This toggle connection is held with its common connecting point slightly to the left of dead center, as shown in Fig. 7, by the action of spring 265. An adjustable stop 270 limits the movement of the parts to the left. Energization of magnet 254 attracts its armature 271 rocking it about its pivot 272 to unlatch a hammer 273, which under action of spring 274 strikes the toggle at its connecting point and moves it sufficiently to the right of dead center to allow spring 265 to further move the parts to total position. A double armed lever 279 secured to shaft 263 and having a roller 281a moves to engage its cam 280 on continually running shaft 21 immediately upon breakage of toggle 267, 268 permitting a link 281 to rock a latch 282 against spring 285 and out of engagement with the toe of an arm 283 fast to a rock shaft 284. Link 281 also, through bell crank 286 actuates link 171 to cause additional paper spacing as has already been described. The aforementioned hammer tripping takes place at a time when cam 275 secured to continually running shaft 21 is about to present its descending portion 276 to a roller 277 mounted on an arm 278 loosely pivoted on shaft 263. As roller 277 follows the periphery 276 of cam 275 it permits shaft 284 to rock clockwise (in Fig. 7) through link 287 attached to arm 278 since latch 282 is now out of cooperation therewith. Continued rotation of shaft 21 causes cam 288 to cooperate with a bell crank lever 289 loose upon shaft 263 and held against cam 288 by spring 290. At such time cam 280 has restored shaft 263 to almost normal position from which roller 291 moves toggle 267, 268 across dead center and against stop 270. A roller 292 strikes finger 293 integral with hammer 273 to restore the same.

In Fig. 2 shaft 284 has connection to a similar shaft 284a through link 294 and arms 295 so that both shafts operate together. As seen in Fig. 4 these shafts extend across accumulating section C of the machine and have a groove 296 cooperating with the ends 297 of levers 298 (see Figs. 16 and 17) pivoted on the adding unit plates 211. This arrangement is for compactness and instead of a single long shaft 284 cooperating with all the adding units, the units are divided into two tiers, the upper tier cooperating with shaft 284a and the lower with shaft 284. Both shafts operate in unison and control their respective adding units in an identical manner.

At the right end of lever 298 is a link 299 having pin and slot connection 300 with the lever. With the parts in the position shown in Fig. 16, link 299 is held in its raised position. But during totaling, with shaft 284a rocked, the link 299 is lowered as seen in Fig. 17.

Resting in slots 301, in link 299, are pins 302 in the free ends of horizontal arms 303 pivoted at 304. Also on the free ends of arms 303 are fulcrum blocks 305 in contact with the under side of spring 204. When the parts of the accumulator are in normal position for adding as in Fig. 16, arm 303 is held in raised position by lever 298 and vertical link 299. Underneath a projection on arm 303 but normally out of contact therewith is a latch 306 on the lower end of arm 307 pivoted at 308. Integral with arm 307 is an upwardly extending arm 309 having its free end in the path of cams 310 fast to gear 212 (see Fig. 28).

While arm 303 is in the above normal position the free end of spring 204 is pressed upwardly by fulcrum 305 and serves, as already explained, to swing the assembly 205, 206, in counterclockwise direction to carry out the adding operation. With the parts in totaling position the arm 303 is held in raised position by the engagement of its lateral projection with latch 306. So that when arm 309 is raised by cam 310, latch 306 is withdrawn from underneath lever 303 which thereupon drops sufficiently to release pressure of fulcrum 305 on spring 204 which then follows the fulcrum downwardly and rotates the assembly 205, 206 clockwise instead of counterclockwise.

In other words, spring 204 tends to rotate the assembly in one direction when fulcrum 305 is elevated and in the other direction when the fulcrum is lowered. This by reason of the fact that with fulcrum 305 released, spring 204 bears upon arm 311 of lever 205 with greater turning effort than is exerted, in the opposite direction by the end of spring 204 at point 312 where the spring fits in a slot in lever 205. This action, as will be shown, takes place to clear the counter wheel after total printing.

Commutator 313 is of insulating material with four metallic inserts 314 in its rim. The commutator is fast to transfer cam 225 and gear 212 as may be seen in Fig. 28. The commutator therefore has four zero positions. Bearing on the rim of the commutators are two brushes 315 and 316 so located so that when the commutator is in zero position both brushes 315 and 316 are on an insert 314.

If it is desired to take a total, magnet 254 is energized to rock shafts 284 and 284a and also shift the contacts described in connection with Fig. 7. Referring now to Fig. 23a contacts T4 and T5 are also closed at this time, one of their blades being fixedly mounted, and the other movable having such relationship as blades 258 and 260 already described.

A pair of make and break cam contacts CR4 and CR5 are arranged to operate to transmit an impulse through the total taking circuit at an instant corresponding substantially one point in advance of 9 position on a card. These cams are mounted on a continually operating shaft 317 (Fig. 6) driven by gears 318 from continually running shaft 21. On shaft 317 are also cams controlling contacts CR2 and CR3 to be described presently.

With contact blades 256, 257, 258, 259, 260 shifted from the position of Fig. 23a, so that contacts 258, 260 and 257, 259 are closed and contacts 256, 259 are open, contacts CR4 and CR5 function to send an impulse through the accumulator in advance of 9 card position, current flowing from right of line 241 through contact T4 now closed, as explained contacts CR4, CR5, line 319, blades 260 to blades 258, cable 320, to individual plugs 321 thence upward through contacts 250 now closed, magnets 200, bus wire 247 and back to line 249 through wire 248. The mechanism for controlling contacts 250 will be explained later.

This energization of magnets 200 engages all the counter wheels for rotation which were not already standing at zero position. For it is to be observed that with commutator 313 at "0" the parts are positioned as shown in Fig. 17 with arm 303 dropped so that fulcrum 305 rests upon arm 311. Obviously when magnet 200 is now energized arm 202 will not turn counterclockwise to drive the register wheel.

During the rotation of the counter wheels the type bars are rising in synchronism with the movement of the register wheels, which in this case may be considered to be the commutators 313. The motion of each type bar is arrested by an impulse through its printer magnet 101, through a circuit from right side of line 241, contact T5 now closed, cam contacts CR2, CR3, bus line 322, brush 316, commutator insert 314, brush 315, wire 323. Thence through contact blade 257, now in contact with blade 259, to printer magnet 101, bus bar 324, wire 325 to opposite side of line 249.

Thus, such counter wheels which represent a significant figure will rotate with one of their inserts 314 approaching brushes 315, 316 to send an impulse exactly as a perforation in a card column closes a circuit to a printer magnet. Simultaneous with the arrival of insert 314 at zero position, cam 310 rocks arm 309 clockwise to throw the counter driving elements out of operative engagement, leaving the counter wheel in a reset or zero position, in a manner already described in connection with Fig. 17.

It is desirable that the type bars associated with such counter elements as are standing at zero, do not reciprocate through their full stroke. They are interrupted very shortly after the commencement of their upward movement, in position to present their upper "0" types at the printing position. Specifically, their movement is from the position of Fig. 3 to that of Fig. 8 wherein the pawl 97 has been tripped to engage the "0" tooth 96. This is accomplished as shown in Fig. 8 by providing a "0" printing element 103a at the upper extremity of type bar 72 in advance of "9". Such counters as stand at zero will be in the position of Fig. 17 when a total is taken so that when the aforedescribed starting impulse is sent through all magnets 200 such counters will not be affected.

Inserts 314 will immediately permit current to flow through brushes 315, 316 and a circuit already traced, to interrupt the type bar 72 at this upper zero position from which the zero may be printed under control of a significant figure to the left. It may be mentioned here, that the above mentioned circuit controlled by cam contacts CR4 and CR5 is timed to be completed just before the "0" tooth 96 reaches the toe of pawl 97 so that if the counter element stands at "0" the corresponding pawl 97 will be tripped to interrupt the upward movement of the bar with the upper zero in position for printing.

Automatic control contacts

Figure 20:
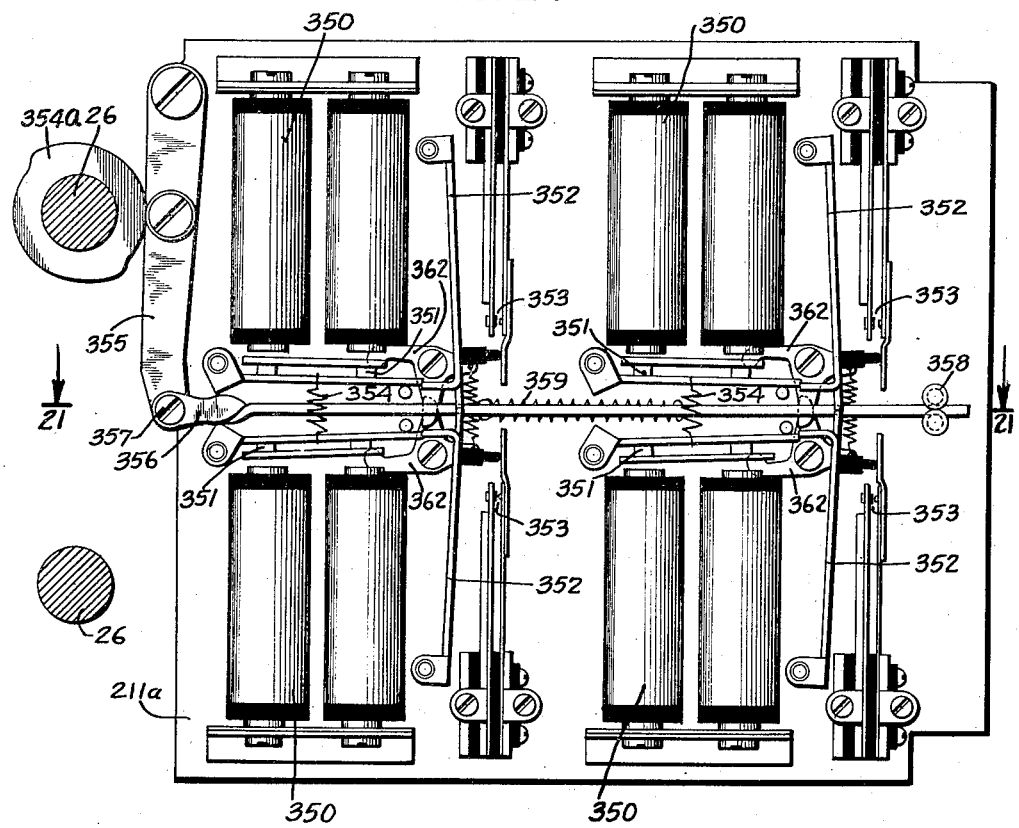
Fig. 20 is a front view of a "group controlling" unit.

In tabulating machines of this type it is customary to provide a number of contacts arranged to be controlled by magnets placed in a series circuit between upper and lower card brushes to detect changes in card groups and initiate subsequent machine operations accordingly. In this machine such magnets 350 are mounted as shown in Fig. 20 upon plates 211a slidably mounted in the machine in parallel alignment with accumulating unit plates 211. Magnet 350 has associated therewith an armature 351 cooperating with a pivoted interposer member 352 to hold contact 353 normally open. Springs 354 connected to the armatures of opposed magnets 350 normally hold the armatures against their respective pin stops. Energization of any magnet will trip its armature to close the associated contact 353 whose function will be explained in connection with the electric circuit of the machine.

Figure 21:
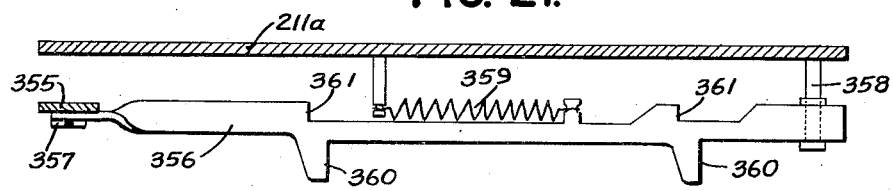
Fig. 21 is a view taken on line 21—21 of Fig. 20.

Mounted on shaft 26 is a double cam 354a cooperating with a follower arm 355 to rock the arm once each cycle of the machine in order to restore such magnet armatures as may have been tripped earlier in the cycle. A restoring bar 356 is pivoted to arm 355 at 357 and is guided at its free end by shouldered pins 358. A spring 359 tends to hold the parts in cooperation with cam 354. Restoring bar 356 is provided with shoulders 360 (see also Fig. 21) which cooperate with the free ends of interposer members 352 to rock them about their pivot points while other shoulders 361 on bar 356 contact pivoted bell crank members 362 to positively restore armatures 351.

Total key

When it is desired to take a hand total a key 363 is actuated (see Figs. 1 and 18). On the inner end of the key stem is pivoted a spring pressed latch 364 cooperating with the longer blade of a pair of contacts 365 to close the same when key 363 is pressed inwardly. This causes initiation of a totaling cycle during which link 134 is actuated as heretofore detailed. Fastened to this link is a plate 366 abutting the under side of latch 364 to raise the latch out of cooperation with the blade of contact 364. Thus the machine is prevented from entering upon a second totaling operation if the operator continues to hold key 363 depressed.

In a manner to be described, key 363 through contact 365, will when the machine is set for hand totaling, energize a magnet 367 in Figs. 11 and 5. This magnet by opening a contact 368 disables the card feed mechanism while totaling operations are being performed. The armature 369 of magnet 367 engages at its lower end a lateral projection of an arm 370 fixed upon rod 371, upon which is also secured a follower arm 372 having a roller 373 mounted on its free end.

With the parts in the position shown in Fig. 11, arm 372 maintains contact 368 in closed position. Energization of magnet 367 releases arm 372 to open contact 368 under the further control of a timing cam 374 mounted upon print shaft 35. Thus contact 368 is restrained from opening while the high concentric portion of cam 374 is in co-operation with roller 373.

Miscellaneous contacts

Figure 14:
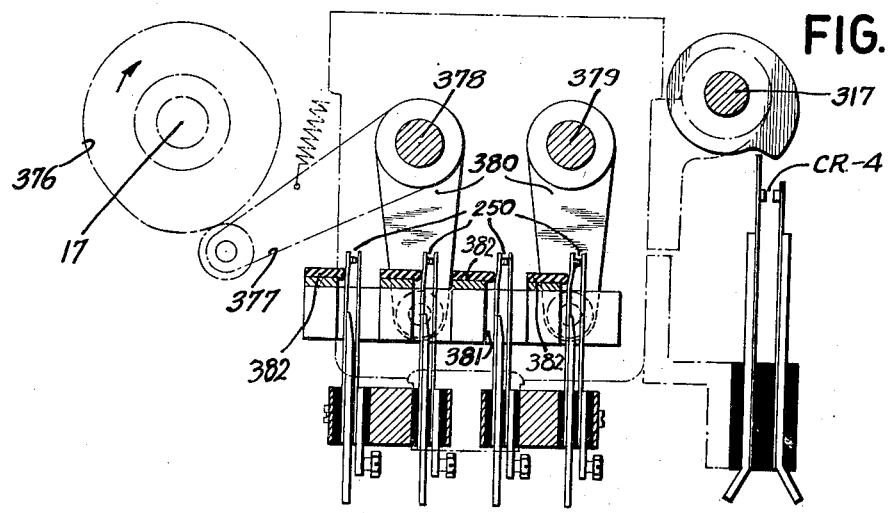
Fig. 14 is a detail section taken on line 14—14 of Fig. 4 showing electric circuit breaking devices.

A series of contacts 250 (Figs. 4, 14 and 23a) are provided, to break the circuit between plug connections 321 and counter magnets 200 at a time when electric transfer operations are being performed. This is to prevent the possibility of back circuits under certain conditions.

Attached to continually running shaft 17 is a cam 376 (see also Fig. 5) cooperating with a spring urged follower arm 377 fixed to one end of a shaft 378 parallel to a similar shaft 379. Pairs of arms 380 secured to these shafts support a pair of plates 381 for parallel movement. Extending between these plates are insulating bars 382 which abut and hold closed the contacts 250 until cam 376 permits shafts 378 and 379 to rock clockwise as viewed in Fig. 14.

Several contacts adapted to operate only when the card feed section A is functioning are controlled by cams mounted upon a shaft 385 (Figs. 4 and 6) having a gear 386 at one end which, through gears 387, receives motion from ring gear 50. These contacts bear the designating prefix CF to identify them as being associated with card feed A and their various functions will be set out in connection with the description of the electric circuit of the machine.

In Fig. 6 is shown a contact 388 mounted upon the card feed clutch magnet housing and operated through a rod 389 resting upon armature 49. With the armature 49 attracted to magnet 48 the rod 389 is urged upwardly to close contacts 388.

The usual plug board 390 for cross connecting the various brush columns and accumulator elements to be used, is shown in Figs. 1 and 3 as being contained in a forward extending compartment 391 of the machine. A hinged cover 392 permits ready access to the plug connections and serves in addition as a convenient work table for the operator.

Wiring diagram

Figs. 23 and 23a placed side by side show the wiring connections between the various magnets, contacts and control keys of the machine. To facilitate the description, related contacts have been given identifying prefixes as for instance: contacts prefixed CF are those which operate only while the card feed is running. Contacts prefixed P are controlled by cams on the print shaft 35 and operate only when such shaft is connected for operation. Contacts labelled T are normally in the positions shown and shift when a totaling cycle of the machine is initiated. Several other contacts prefixed CR are controlled by cams mounted on a constantly running shaft of the machine.

The time of opening and closing of all these contacts is clearly indicated in the lower section of the time chart illustrated in Fig. 24 to which reference may be made to ascertain the relative positions of the elements of the machine throughout its operation.

To start the machine, the main switch 400 will be closed to supply current to the motor 12 to start the main drive shaft 17 and the other constantly running shafts of the machine.

Presuming several groups of cards to be in the machine, the feeding of the cards and the sensing of the data contained thereon may be started in the following manner. The operator presses the start key ST closing contacts ST1 and ST2. This sets up a circuit from line 241, through contacts ST2, wire 401, card feed clutch magnet 48, contact T7, contact 368, contact ST1, stop key contact 402, to wires 403, 404 to the other side of line 249. The energization of the card feed clutch magnet 48 releases the card feed clutch for operation and the feeding of the cards commences immediately. Contact 388 in a manner described short circuits contact ST1 while the magnet 48 remains energized.

The operator releases the start key as the cards feed through the machine to depress card levers 70 and 71. If it is desired to print the items sensed by the brushes, switch S4 is positioned as shown so that after closure of start key contact ST1 and actuation of contact LCL1, a circuit will be established from line 241, through wire 405 to print clutch magnet 39. Thence through wire 406, switch S4, contact LCL1, contacts 368, 388, 402, and wires 403, 404 to opposite side of line 249.

The closing of contacts UCL1 and UCL2 sets up a circuit from line 241, wire 407, contact UCL1, contact UCL2, wire 408, wires 401, to magnet 48 and thence through the circuit previously pointed out, to line 249. It has heretofore been explained that card lever 70 shifts its position between the passage of successive cards. To maintain the circuit through magnet 48 a cam contact CF1 is provided to direct the current from wire 407 to wire 401 during the interval between the opening and closing of the upper card lever contacts UCL1 and UCL2.

Should the cards fail to feed through the machine now, the card levers 70 and 71 will fail to be depressed and their contacts will open. The opening of contacts UCL1 and UCL2 will shift control of the card feed clutch magnet 48 to cam contact CF1 which will break the circuit at the proper point in the following cycle so as to insure passage of the last card beyond the lower brushes. Having passed the lower brushes, the card permits contact LCL1 to open thereby breaking the circuit through print clutch magnet 39 to bring the parts to a stop in a definite position. The machine may also be stopped by depression of the stop key 409. This opens contact 402, breaking the circuits through clutch magnets 39 and 48 to stop the machine at the end of the cycle.

Listing and accumulating

If it is desired to accomplish listing of the data contained in a specific column on the card the plug socket 63c associated with that particular column will be connected by means of a plug wire 410 to a socket 411. This plugging may be to any one of the several sockets 411 depending upon which type bar is desired to be controlled from the particular column on the card. Tracing the circuit through the plugging here illustrated, the following result will be effected: As the card is passing the brushes the type elements will rise synchronously past the printing position. When a hole in the card passes under the brush 63 a circuit will be established from line 241, wire 412, contacts LCL2, contacts CF3 now closed, brush 63b to common contact roll 63a. Then through the appropriate brush 63, plug 63c, wire 410, plug 411, cable 413, to a wire 414 corresponding to the selected column. Thence through contact blade 256, blade 259, wire 415, magnet 101, bus bar 324, wire 325 to other side of line 249. The type bar will then be stopped with the type element corresponding to the position of the hole in the column on the card.

If it is desired merely to accumulate this amount without the accompaniment of printing a plug wire 415 is connected as shown so that a circuit traced as follows is completed when a hole in the card cooperates with a brush 63. From line 412 to LCL2, contact CF3, brush 63b, roll 63a, brush 63, plug 63c, wire 415, plug 321, contact 250, magnet 200, bus wire 247, wire 248, back to line 249.

If listing and accumulating are both desired to be effected from the same column a plug wire 416 is inserted as shown between plug 63c and a split plug 417. The circuit above traced from line 241, follows plug wire 416 to plug 417 which has connection to both plugs 321 and 411 so that the circuit branches at this point to follow through printer magnet 101 and counter magnet 200 as already traced.

Group control

In this art the cards are usually grouped according to transactions or commodities or salesmen. In such case the cards of each group are given a special designation which usually takes the form of a number registered in certain columns on the card. This number is utilized to control the stopping or other operations of the machine so that when the last card of a group passes through the machine, the machine may be caused to stop or to take a total of the group.

Assuming that we are using but one column for group controlling, a plug connection (not shown) is made between selected plug 62c to a plug 350a and also between corresponding plugs 63c and 350b. This connects the magnet 350 in series with plugs 62c and 63c of the particular column desired for controlling. The card feeding is such that while one card is passing under the brushes 62, the next succeeding card is passing under the brushes 63 and the timing is such that as any index position is passing under brushes 62 the corresponding position on the succeeding card will be passing under the corresponding brushes 63. Therefore, if the perforations in the two cards are the same the brushes 62 and 63 will make contact simultaneously and the following circuit will be established.

From line 241 to wire 412, contact LCL2, contact CF3, brush 63b, roll 63a, brush 63, plug 63c, plug connection to plug 350b, magnet 350, plug 350a, connection to plug 62c, brush 62, roll 62a, brush 62b, wire 418, contact T8 now closed and back to line 249. Energization of magnet 350 closes the corresponding contact 353. Since we are assuming the use of but a single column for control, a plug connection 419 is used to bridge plug 420 and plug 421. This shunts out such control columns of contacts 353 as are not being used. Switch S1 is thrown to closed position.

If it is desired to have the machine stop upon detecting a change in group number a switch S3 is swung to dotted line position and the circuit is as follows: from line 249, wires 404 and 403, resistance 422 to a cam contact CR1, which closes for a short interval. Assuming that the two cards read by the brushes agreed as to control perforations, the circuit continues through wire 423, uppermost contact 353, now closed, to the upper blade of the second contact 353 and its plug 421. Then through wire 419 to plug 420, switch S1, contact UCL1 and wire 407 to line 241. This circuit shunts around magnet 367 which is of greater resistance.

If now the compared cards fail to agree, the full flow of current will pass from contact CR1 through wire 424, magnet 367, switch S3 to plug 420 and thence to line 241 as traced above. Energization of magnet 367 opens, as we have seen, the contact 368 thus breaking the circuits through both clutch magnets 39 and 48 to stop the machine with contact 368 in open position. Resumption of operation cannot be accomplished by depression of the start key since no circuit will be completed through either clutch, and it will be recalled that such circuits may go through contacts 368 which are now open. It is necessary now to operate total key 363 closing contacts 365. This establishes a circuit from line 241, wire 407, contact UCL3 (now closed), contact 365, magnet 254, wire 424 to continually running contact CR1, resistance 422, wires 403, 404 to line 249. Energization of magnet 254, as has already been explained in detail, causes the machine to initiate a totaling cycle to print the amounts standing in the accumulators. Closure of a contact T6 is also effected by magnet 254 to energize clutch magnet 39 so that the printing mechanisms may operate in synchronism with the counter elements.

If it is desired to have the machine automatically enter upon such totaling cycle upon change in card group designation, the switch S3 is moved to full line position so that failure of contact 353 to close will send the current from contact CR1 through wire 424 to magnet 254, switch S3 to plug 420 and back to line in the same manner as above described. A contact T7 under control of the mechanisms controlled by magnet 254 is held open during totaling to insure inoperativeness of the card feeding devices.

Having completed the printing of this total the machine will come to rest upon the opening of contact T6. Should it be desired, however, to automatically resume operation of the card feeding and accumulation of the following group of cards a switch S2 may be closed so that, as the total cycle nears completion, a cam contact P2 controlled from the print shaft 35 prepares a circuit through the card feed clutch magnet 48 which is completed upon reclosure of contact T7. This circuit is traced from line 241, wire 407, contact CF1 now closed, wire 401, magnet 48, contact T7, contact P2, switch S2, stop key contact 402, wires 403, 404 to line 249.

Total card control

In some instances it is desirable to use so-called "total cards" having a perforation in some index position. The upper brush 62 of the column in which this hole is punched is plug-wired in series with a contact adapted to close at a time corresponding to that when a similar hole would make contact on the preceding card.

Assume a total card (as shown in Fig. 29) having a perforation at "12" index point position. The circuit follows from line 241, wire 412, Fig. 23a contact LCL2, wire 426, cam contact CF5, timed to close at "12", plug 427, connected by a plug wire (not shown) to lowermost plug 350b, Fig. 23 magnet 350, plug 350a, a plug wire (not shown) to plug 62c Fig. 23a of the upper brush 62, in the column in which the total card bears the "12" perforation roll 62a, brush 62b, wire 418, contact T8 to line 249. This closes lowermost contact 353 to control the machine in a manner as follows:

For this manner of group controlling, switch S1 is moved to its dotted or open position and a plug wire 475 is inserted between plugs 476 and lowermost plug 421. As long as cards are passing through the machine unaccompanied by a total card, the aforementioned lowermost magnet 350 and its associated contact 353 remain unaffected.

Bearing in mind that the rest of the group of contacts 353 are not being used at this time and are therefore in open position, a circuit established through a "12" hole in a total card and contact CF5, as traced above, will have the effect of short-circuiting switch S1 and controlling the machine accordingly.

For instance, if switch S3 is in its full line position, a circuit will be established as follows: from line 249, wires 404, 403, resistance 422, contact CR1, wire 424 (because as noted, contacts 353 above the lowermost are open), magnet 254, switch S3, plug 420, wire 477, lowermost contact 353, its plug 421, connection 475, plug 476, contact UCL1 now closed, wire 407, to line 241. This energization of magnet 254 as already seen, initiates a totaling cycle. If switch S3 were in its dotted line position, this same circuit would prevail through magnet 367 to stop the machine in preparation for hand totaling.

Group indicating

When listing only or listing and accumulating together, the group number may be printed beside the variable items in such group. This is accomplished simply by plugging from the columns on the card in which the group number is perforated to "list only" plugs 411 of the columns on the record sheet in which it is desired to have the number appear.

When "accumulating only" the group number is similarly plugged to the desired position and the machine is caused to take a listing cycle wherein this group number is printed on the record sheet. Accumulating proceeds in the usual manner and when a total is subsequently taken it will be printed adjacent to the previously printed group number.

With the machine at a standstill, that is to say, all but the continually running elements idle, depression of total key 363 will cause the machine to execute a total-and-clear cycle during which, as we have already seen, print clutch magnet 39 is energized by closure of contact T6.

Referring now to Figs. 2, 5 and 5a the armature 36 of magnet 39 is adapted when operated to actuate a rod 478 to close contact 479. Rod 478 has pinned thereto a collar 480 adapted to be engaged by a bell crank latch 481 to hold contact 479 closed. Mounted on the side of the housing of magnet 39 is a magnet 482 and a cooperating armature 483 held away from the magnet 482 against a pin 484 by a spring 485. The free end of armature 483 coacts with a pivoted lever 486 to rock the same in a clockwise direction as viewed in Fig. 5a, so that it strikes pin 487 in spring pressed bell crank 481 thereby releasing rod 478 to open contact 479.

Returning again to Fig. 23, the sequence of operations to obtain group indicating will now be traced. It will be recalled that when accumulating only, switch S4 is open and switch S6 is moved to its dotted line position due to the fact that these two switches are connected together mechanically for simultaneous operation.

During the last preceding total cycle or initial machine clearing cycle as we have assumed, contact T6 is closed and remains so during the totaling operations.

This energizes magnet 39 to cause the total to be read from the accumulator and printed on the record sheet. Also during this cycle, contact 176 is closed as already explained, to establish a circuit from line 241, magnet 166, contact 176 to line 249. This effects paper spacing after the total has been printed and presents a new entry line at the printing position.

Contact P3 mounted on print shaft 35 closes momentarily near the commencement of the cycle to energize magnet 482 from line 241, through said magnet, switch S6 (in dotted line position), contact P3 to line 249. However, since contact T6 is maintained in closed position throughout this cycle contact 479 will remain closed after contact P3 again opens.

Having printed the total and spaced the paper, the machine is ready to resume card feeding and accumulating either automatically or by manual initiation. In either case, as already described in detail, contact 388 is closed by action of magnet 48, and the following circuit ensues: from line 241, wire 405, magnet 39, wire 406, wire 487, contact 479 now closed, contact P1 also closed, contact LCL1, contact 368, contact 388, contact 402, wires 403, 404, to line 249. Thus the printing elements operate during the first cycle of the next card group and the group number is sensed by the brushes and conveyed to the type bars for printing. During this cycle contact P1 opens to break the circuit and contact P3 closes to energize magnet 482 which releases contact 479 so it may open.

The contact P3 when the switch S6 is in full line position for listing, periodically closes the circuit through magnet 166 for spacing the record sheet between items. During totaling contact 176 closes to effect additional spacing after the total is printed.

The usual cam contact CR4 is also provided together with a plug connection 450 which may be plugged to any desired counter. While cards are feeding this contact sends an impulse each cycle to accumulate the number of cards passing through the machine.

A double plug connection 451 is also provided which may be connected to plugs 452 for controlling type bar magnets 101a to position the associated type bars in an asterisk printing position. This circuit as may be noted, will be through contact T6 closed when totaling so that the asterisk will designate that the particular item printed is a total.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims:

Having described my invention, what I claim and desire to secure by Letters Patent is:

1. In an accounting machine having item entering means, printing means and an accumulator, a type carrier adapted to be positioned in a series of printing positions by said entering means or said accumulator, said type carrier having a further printing position controlled by said accumulator when the latter registers zero during totaling operations of the machine.

2. In an accounting machine having a type bar, an accumulator element and means for reading the amount indicated therein, said means comprising a commutator and a pair of associated brushes, and means for forming a circuit through said brushes and commutator to control the position of said type bar when said accumulator element registers zero, and while said brushes and commutator are relatively stationary.

3. In an accounting machine, automatic control devices, listing circuit connections, a circuit switching device maintained in normal position by a toggle, and adapted to normally maintain said listing circuit connections, a magnet controlled by said automatic control devices and adapted upon energization to cause breaking of said toggle to move said switching device from normal position to alter said connections.

4. In a machine of the class described, a plurality of accumulator elements, driving means, and means for coupling said elements thereto, total taking mechanism adapted to effect an operation of said coupling means and means controlled by said accumulator elements for suppressing operation of said coupling means.

5. In a machine of the class described, a plurality of rotary accumulator elements, a plurality of corresponding type carriers adapted to be positioned thereby, total taking mechanism and means controlled thereby for effecting a rotation of the accumulator elements standing at significant figures to position their corresponding type carriers, clutching devices for effecting rotation of said accumulator elements and means controlled by the accumulator elements standing at zero for preventing clutching movement of the associated clutching devices.

6. In a machine of the class described, an accumulator element, driving means therefor, a spring tensioned device for coupling said element to said driving means, and means controlled by said element for relieving the tension in said coupling device whereby said device is rendered ineffective.

JOHN ROYDEN PEIRCE.